United States Patent
Hayakawa

(10) Patent No.: US 6,348,945 B1
(45) Date of Patent: Feb. 19, 2002

(54) METHOD AND DEVICE FOR ENCODING DATA

(75) Inventor: Tomoo Hayakawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/068,236

(22) PCT Filed: Sep. 3, 1997

(86) PCT No.: PCT/JP97/03091

§ 371 Date: Jan. 25, 1999

§ 102(e) Date: Jan. 25, 1999

(87) PCT Pub. No.: WO98/10594

PCT Pub. Date: Mar. 12, 1998

(30) Foreign Application Priority Data

Sep. 6, 1996 (JP) .............................................. 8-237040

(51) Int. Cl.[7] .............................................. H04N 07/18
(52) U.S. Cl. .......................... 348/240.18; 375/240.02; 375/240.03
(58) Field of Search ................................ 348/403, 404, 348/405, 419; 382/236; 375/240.03–240.27

(56) References Cited

U.S. PATENT DOCUMENTS

| | | | | |
|---|---|---|---|---|
| 5,374,958 A | * | 12/1994 | Yanagihara | .................. 348/405 |
| 5,410,352 A | | 4/1995 | Watanabe | |
| 5,585,853 A | * | 12/1996 | Juri et al. | ................... 348/405 |
| 5,861,921 A | * | 1/1999 | Shimizu et al. | ............. 348/405 |
| 5,959,675 A | * | 9/1999 | Mita et al. | ................... 348/405 |

FOREIGN PATENT DOCUMENTS

| | | |
|---|---|---|
| EP | 0 498 674 | 8/1992 |
| EP | 0 582 819 | 2/1994 |
| JP | 62-222783 | 9/1987 |
| JP | 1-267781 | 10/1989 |
| JP | 3-10486 | 1/1991 |
| JP | 3-29582 | 2/1991 |
| JP | 4-145781 | 5/1992 |
| JP | 4-168880 | 6/1992 |
| JP | 4-222169 | 8/1992 |
| JP | 4-257185 | 9/1992 |
| JP | 4-321391 | 11/1992 |
| JP | 4-329089 | 11/1992 |
| JP | 4-367183 | 12/1992 |

(List continued on next page.)

*Primary Examiner*—Andy Rao
(74) *Attorney, Agent, or Firm*—Frommer Lawrence & Haug LLP; William S. Frommer; Bruno Bolito

(57) ABSTRACT

DCT coefficient data obtained by transforming inputted picture data at a DCT (Discrete Cosine Transform) circuit 2 is quantized by selected one of plural quantizers at a quantizing circuit 7 to allow the quantized data to undergo variable length encoding at a variable length encoding circuit 8 to output it. A class designation circuit 30 compares DCT coefficient data from the DCT circuit 2 with threshold values $Th_1$, $Th_2$, $Th_3$ in macro block units to carry out class designation to output activity code AT. A code quantity estimation section 10 estimates total encoded data quantity when data corresponding to 1 video segment which is 5 macro blocks of DCT coefficient data which have been read out from a zigzag read-out circuit 3 is quantized by respective quantizers to allow the quantized data thus obtained to undergo variable length encoding to send, to the quantizing circuit 7, quantizer number for determining an optimum one of the quantizers in which the estimated data quantity is reference value or less. Any different one of reference values of the code quantity estimation section 10 and threshold values $Th_1$, $Th_2$, $Th_3$ of the class designation circuit 30 are read out from the compression factor table 12 in dependency upon information of a desired compression factor from a terminal 11. Thus, a desired compression factor can be easily obtained in compression-encoding.

22 Claims, 16 Drawing Sheets

FOREIGN PATENT DOCUMENTS

| | | |
|---|---|---|
| JP | 5-22712 | 1/1993 |
| JP | 5-168001 | 7/1993 |
| JP | 5-176311 | 7/1993 |
| JP | 6-38189 | 2/1994 |
| JP | 6-86255 | 3/1994 |
| JP | 6-141280 | 5/1994 |
| JP | 7-107481 | 4/1995 |
| JP | 7-288809 | 10/1995 |
| JP | 8-130736 | 5/1996 |

* cited by examiner

| QUANTIZER NO. | CLASS NO. | | | | AREA NO. | | | | | | | |
|---|---|---|---|---|---|---|---|---|---|---|---|---|
| | 0 | 1 | 2 | 3 | 0 | 1 | 2 | 3 | 4 | 5 | 6 | 7 |
| 15 | 15 | | | | 1 | 1 | 1 | 2 | 2 | 2 | 2 | 4 |
| 14 | 14 | | | | 1 | 1 | 1 | 2 | 2 | 2 | 2 | 4 |
| 13 | 13 | | | | 1 | 1 | 1 | 2 | 2 | 2 | 2 | 4 |
| 12 | 12 | 15 | | | 1 | 1 | 1 | 2 | 2 | 2 | 2 | 4 |
| 11 | 11 | 14 | | 15 | 1 | 1 | 1 | 2 | 2 | 2 | 2 | 4 |
| 10 | 10 | 13 | | 14 | 1 | 1 | 1 | 2 | 2 | 2 | 2 | 4 |
| 9 | 9 | 12 | 15 | 13 | 1 | 1 | 1 | 2 | 2 | 2 | 2 | 4 |
| 8 | 8 | 11 | 14 | 12 | 1 | 1 | 2 | 2 | 2 | 2 | 4 | 4 |
| 7 | 7 | 10 | 13 | 11 | 1 | 2 | 2 | 2 | 2 | 4 | 4 | 4 |
| 6 | 6 | 9 | 12 | 10 | 2 | 2 | 2 | 2 | 4 | 4 | 4 | 4 |
| 5 | 5 | 8 | 11 | 9 | 2 | 2 | 2 | 4 | 4 | 4 | 4 | 4 |
| 4 | 4 | 7 | 10 | 8 | 2 | 2 | 4 | 4 | 4 | 4 | 4 | 8 |
| 3 | 3 | 6 | 9 | 7 | 2 | 4 | 4 | 4 | 4 | 4 | 8 | 8 |
| 2 | 2 | 5 | 8 | 6 | 4 | 4 | 4 | 4 | 4 | 8 | 8 | 16 |
| 1 | 1 | 4 | 7 | 5 | 4 | 4 | 4 | 4 | 8 | 8 | 16 | 16 |
| 0 | 0 | 3 | 6 | 4 | 4 | 4 | 4 | 8 | 8 | 16 | 16 | 16 |
| | | 2 | 5 | 3 | 4 | 4 | 8 | 8 | 16 | 16 | 16 | 16 |
| | | 1 | 4 | 2 | 4 | 8 | 8 | 16 | 16 | 16 | 16 | 32 |
| | | 0 | 3 | 1 | 8 | 8 | 16 | 16 | 16 | 16 | 32 | 32 |
| | | | 2 | 0 | 8 | 16 | 16 | 16 | 16 | 32 | 32 | 32 |
| | | | 1 | | 16 | 16 | 16 | 16 | 32 | 32 | 32 | 32 |
| | | | 0 | | 16 | 16 | 16 | 32 | 32 | 32 | 32 | 32 |

FIG.3

|   | 0 | 1 | 2 | 3 | 4 | 5 | 6 | 7 | h |
|---|---|---|---|---|---|---|---|---|---|
| 0 | DC | 0 | 0 | 1 | 1 | 2 | 3 | 4 | |
| 1 | 0 | 0 | 1 | 1 | 2 | 3 | 4 | 5 | |
| 2 | 0 | 1 | 1 | 2 | 3 | 4 | 5 | 5 | |
| 3 | 1 | 1 | 2 | 3 | 4 | 5 | 5 | 6 | |
| 4 | 1 | 2 | 3 | 4 | 5 | 6 | 6 | 6 | |
| 5 | 2 | 3 | 4 | 5 | 6 | 6 | 7 | 7 | |
| 6 | 3 | 4 | 5 | 5 | 6 | 7 | 7 | 7 | |
| 7 | 4 | 5 | 5 | 6 | 6 | 7 | 7 | 7 | | v

FIG.4A

|   | 0 | 1 | 2 | 3 | 4 | 5 | 6 | 7 | h |
|---|---|---|---|---|---|---|---|---|---|
| 0 | DC | 0 | 0 | 1 | 1 | 2 | 3 | 4 | |
| 1 | 0 | 0 | 1 | 1 | 2 | 3 | 4 | 5 | |
| 2 | 0 | 1 | 1 | 2 | 3 | 4 | 5 | 5 | |
| 3 | 1 | 1 | 2 | 3 | 4 | 5 | 5 | 6 | |
| 4 | 1 | 2 | 3 | 4 | 5 | 6 | 6 | 6 | |
| 5 | 2 | 3 | 4 | 5 | 6 | 6 | 7 | 7 | |
| 6 | 3 | 4 | 5 | 5 | 6 | 7 | 7 | 7 | |
| 7 | 4 | 5 | 5 | 6 | 6 | 7 | 7 | 7 | | v

FIG.4B

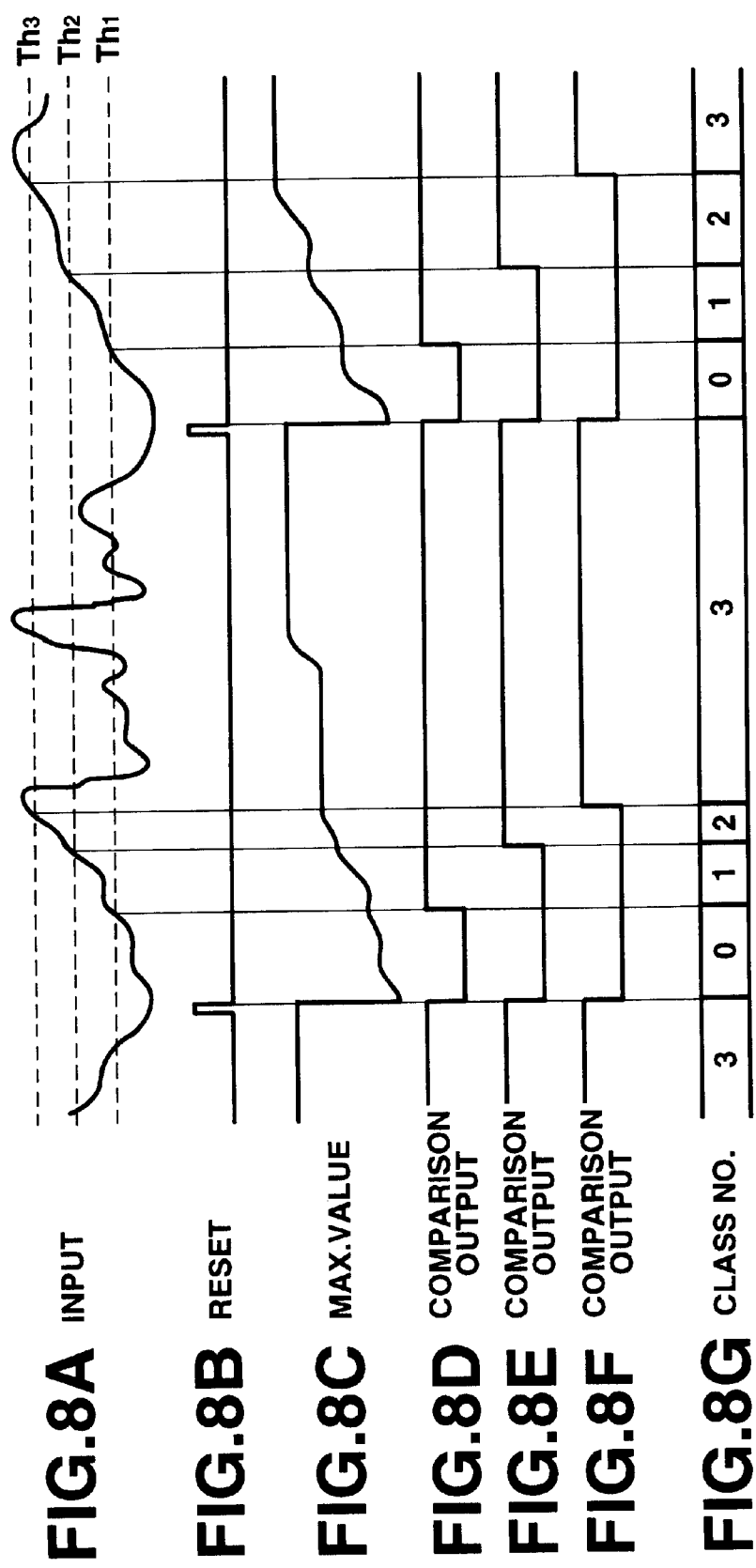

REFERENCE VALUE Rf
OF ESTIMATOR

| COMPRESSION FACTOR | REFERENCE VALUE Rf |
|---|---|
| 1/5 | 2560 |
| 1/10 | 1280 |
| 1/20 | 640 |

FIG.9A

THRESHOLD VALUES $Th_1$, $Th_2$, $Th_3$
OF CLASS DESIGNATION

| COMPRESSION FACTOR | $Th_1$ | $Th_2$ | $Th_3$ |
|---|---|---|---|
| 1/5 | 4 | 16 | 64 |
| 1/10 | 2 | 4 | 32 |
| 1/20 | 0 | 2 | 16 |

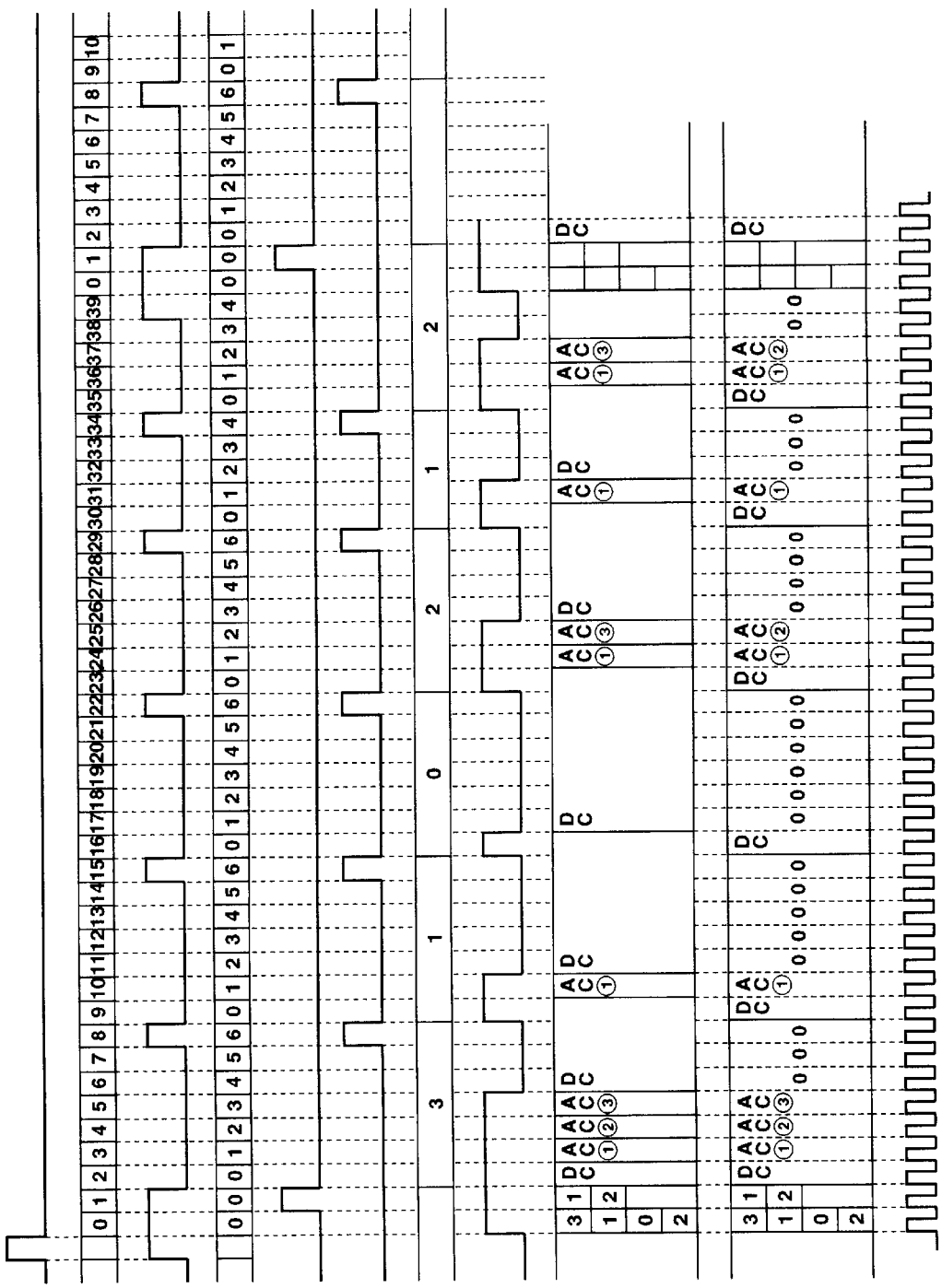

METHOD AND DEVICE FOR ENCODING DATA

TECHNICAL FIELD

This invention relates to a data encoding method and a data encoding apparatus for carrying out compression-encoding of digital information data such as digital video signal, etc., and more particularly to a data encoding method and a data encoding apparatus capable of easily changing compression factor in the data compression format of fixed compression factor.

BACKGROUND ART

Since data quantity of digital information data such as digital video signal, etc. is vast, there are many instances where compression encoding for compressing data quantity is implemented. Data encoding methods and data encoding apparatuses particularly using DCT (Discrete Cosine Transform) of this compression encoding are frequently used in recent years. For example, also in the format of digital VTR having tape width of ¼ inches, which is the so-called DV format, the data encoding method using this DCT is employed.

In such an encoding of digital information data, the compression factor and the data rate are fixed in order to carry out transmission and/or recording/reproduction by a predetermined format. For example, in the case where synchronization is taken in fixed block units, data compression is implemented within the range where data quantity is not above the maximum data quantity every block. Invalid data are filled into the portions except for compressed valid data within respective blocks so that respective data quantities every blocks are fixed. Moreover, it is also conceivable to allocate data over blocks. In the case where compressed valid data quantity corresponding to a predetermined block is above the maximum data quantity within the corresponding block, overflowed valid data is allocated to any other block where valid data quantity is less. For example, in the above-described DV format, allocation of data between respective macro blocks is carried out within video segments of fixed length consisting of five macro blocks obtained after undergone shuffling within picture on screen.

Meanwhile, in recent years, the data recording capacity of the hard disc has been increased and it is also put into practical use to record or reproduce compressed data of digital video signal, etc. with respect to the hard disc. Since recording/reproducing apparatus (unit) using such hard disc, etc. is random-accessible, it is possible to momentarily retrieve an arbitrary image. This recording/reproducing unit is suitable in, e.g., editing work.

In this case, e.g., in use purpose of carrying out off-line editing of video signals, it is sufficient to take picture quality to such a degree that the content can be confirmed. It is important to increase the compression factor to reduce data quantity in a sense of saving the capacity of the recording medium. On the contrary, in the main editing, it is important to hold the compression factor down to lower value to realize improvement of the picture quality. In addition, if the compression factor can be changed in dependency upon use purpose, it is possible to realize the picture qualities and the medium capacities optimum for respective use purposes. This is preferable.

This invention has been made in view of actual circumstances as described above, and its object is to provide a data encoding method and a data encoding apparatus which are capable of easily changing the compression factor in the format of digital VTR having tape width of ¼ inches, which is data compression format of the fixed compression factor like the so-called DV format.

DISCLOSURE OF THE INVENTION

A data encoding method and a data encoding apparatus according to this invention are adapted so that in the case where input data is orthogonally transformed to quantize the input data thus transformed thereafter to allow the quantized data to undergo variable length encoding, an approach is employed to estimate total quantity of encoded data when undergone variable length encoding on the basis of the orthogonally transformed data to determine quantization step in quantization on the basis of reference value different (changing) in dependency upon compression factor and the estimated data quantity.

By changing the reference value in dependency upon the compression factor, total quantity of encoded data is changed.

Moreover, a data encoding method and a data encoding apparatus according to this invention are adapted so that in the case where input data is orthogonally transformed to quantize the data thus transformed thereafter to allow the quantized data to undergo variable length encoding, an approach is employed to change threshold value for designating class indicating fineness of quantization on the basis of the orthogonally transformed data in dependency upon the compression factor.

By changing threshold value of class designation in dependency upon the compression factor, total quantity of encoded data is changed.

In this case, when there is assumed picture compression format of the fixed compression factor such that the input data is picture data, and that in quantizing DCT coefficient data obtained by carrying out Discrete Cosine Transform (DCT) at any one of plural quantizers to allow the quantized data to undergo variable length encoding, an approach is employed to estimate data quantity when quantization and variable length encoding in video segment units of DCT coefficient data to compare the estimated data quantity with reference value to thereby determine optimum quantizer to compare data of block unit of DCT coefficient data with threshold value to thereby determine class indicating fineness of quantization, it is preferable to change the reference value, or reference value and threshold value in dependency upon information of a desired compression factor.

By changing the reference value, or the reference value and the threshold value in dependency upon information of the compression factor, finally encoded data quantity obtained after undergone compression-encoding is changed. Thus, the comparison factor can be changed.

BRIEF DESCRIPTION OF THE DRAWINGS

FIG. 3 is a view showing an example of quantization table of the embodiment of this invention.

FIG. 4 is a view showing an example of area numbers of DCT coefficients of the embodiment of this invention.

FIG. 8 is a timing chart for explaining the operation of class designation circuit of the embodiment of this invention.

FIG. 9 is a view showing an example of compression factor table of the embodiment of this invention.

FIG. 13 is a timing chart for explaining the operation of the digital information data recording apparatus of FIG. 11.

FIG. 16 is a timing chart for explaining the operation of the digital information data reproducing apparatus of FIG. 15.

BEST MODE FOR CARRYING OUT THE INVENTION

Several preferred embodiments according to this invention will be described below with reference to the attached drawings.

Figure 1:
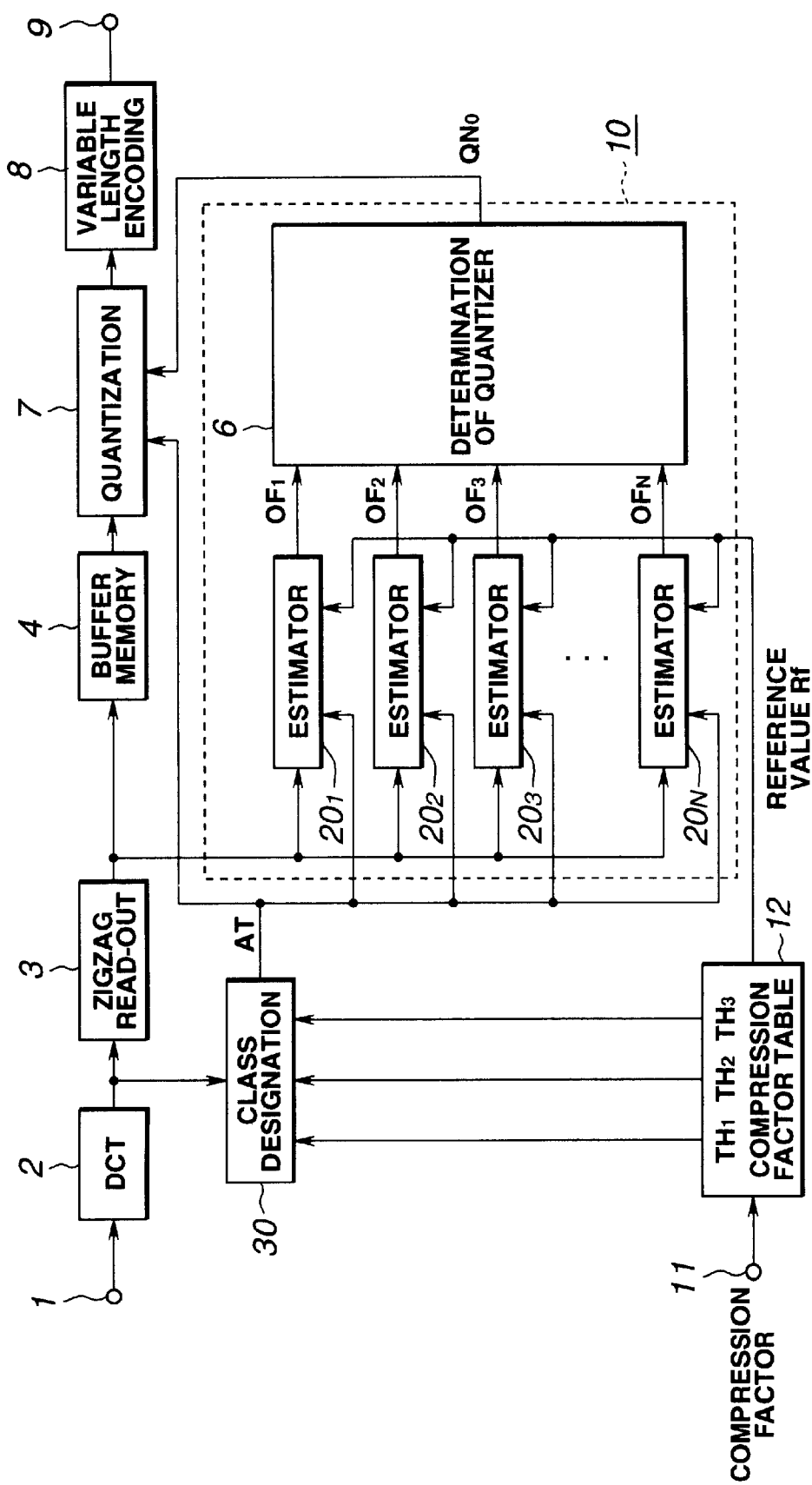
FIG. 1 is a block diagram showing outline of the configuration of an embodiment of a data encoding apparatus to which a data encoding method according to this invention is applied.

FIG. 1 is a block diagram showing outline of the configuration of an example of a data encoding apparatus to which a data encoding method which is the embodiment of this invention is applied.

In FIG. 1, a digital video signal delivered to an input terminal 1 is blocked into, e.g., 8×8 pixels, and these pixel data are delivered to a DCT (Discrete Cosine Transform) circuit 2. The DCT circuit 2 carries out DCT processing of the blocked video signal (i.e., pixel data) to convert the pixel data into coefficient data of the frequency region of 8×8. Since the video signal has correlation, when the video signal is transformed into signal components in the frequency region, most of them become lower frequency components. In this case, spectrum components having large power are concentrated on the lower frequency band. According as the frequency component is shifted to high frequency band side, its power becomes smaller.

Figure 2:
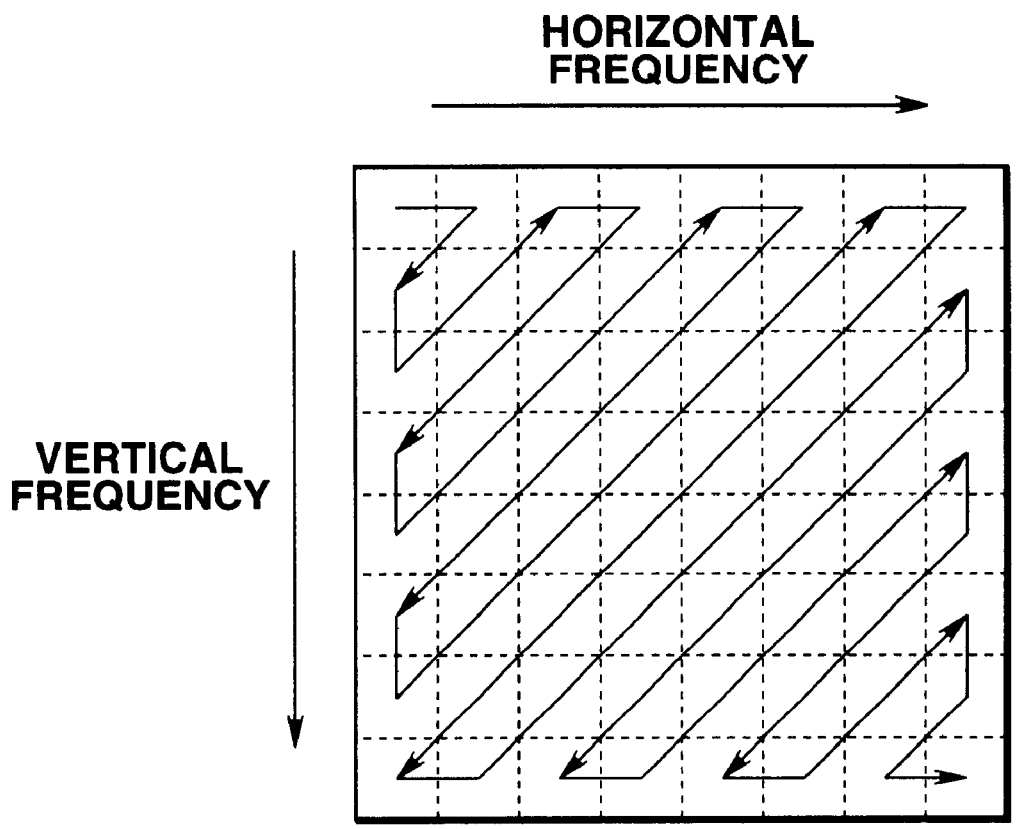
FIG. 2 is a view showing an example of output order of DCT coefficients of the embodiment of this invention.

An output from the DCT circuit 2 is sent to a zigzag read-out circuit 3 and a class designation (determination) circuit 30. As shown in FIG. 2, the zigzag read-out circuit 3 reads out data in zigzag manner in order from data of lower frequency of DCT coefficients of 8×8. An output from the zigzag read-out circuit 3 is delivered to a buffer memory 4, and is sent to a code quantity estimation section 10. The buffer memory 4 serves to store data of a predetermined buffer unit serving as the first data range, e.g., data corresponding to one video segment which will be described later. As described later, a class designation circuit 30 examines fineness of pattern in units of DCT block serving as the second data range to allow activity (degree of fineness) of its DCT block to undergo class designation into four stages to output activity code AT of 2 bits indicating corresponding class. It is preferable to send AC components of coefficient data from the DCT circuit 2 to the class designation circuit 30.

The code quantity estimation section 10 includes plural (N number of) code estimate elements (hereinafter referred to as estimators) $20_1, 20_2, \ldots, 20_N$. To these respective estimators $20_1, 20_2, \ldots, 20_N$, output from the zigzag read-out circuit 3 is sent, and activity code AT from the class designation circuit 30 is sent. At the estimators $20_1, 20_2, \ldots, 20_N$, quantizer numbers QNo different from each other (quantizer number when N=16 is 0~15) are set as in the more practical example of the case of N=16 shown in FIG. 3, for example, and there is set table for determining quantization step (quantization table) by class number that the activity code AT indicates and area numbers (FIGS. 4A and 4B) allocated (assigned) in advance with respect to respective pixel blocks within the DCT block. The detail thereof will be described later.

The estimators $20_1, 20_2, \ldots, 20_N$ respectively estimate total code quantities when data within respective video segments are quantized by respective quantization tables with video segment consisting of five macro blocks obtained after undergone shuffling in predetermined buffer units, e.g., within picture on screen being as a predetermined buffer unit to allow them to undergo variable length encoding to generate outputs $OF_1, OF_2, \ldots, OF_N$ when respective total code quantities are a predetermined reference value Rf or more. These outputs $OF_1, OF_2, \ldots, OF_N$ are sent to a quantizer determination circuit 6. The quantizer determination circuit 6 determines, on the basis of outputs $OF_1, OF_2, \ldots, OF_N$ from the estimators $20_1, 20_2, \ldots, 20_N$, an optimum quantizer in which total code quantity of a predetermined buffer unit corresponding to the first data range, e.g., video segment unit is less than the predetermined reference value Rf. Output from this quantizer determination circuit 6 is sent to a quantizing circuit 7.

At the quantizing circuit 7, N kinds, e.g., 16 kinds of quantizers are prepared in advance, and any one of these quantizers is selected by output from the quantizer determination circuit 6. Moreover, the quantizing circuit 7 is adapted so that class is designated by activity code AT from the class designation circuit 30. Output from the quantizing circuit 7 is sent to a variable length encoding circuit 8, at which it is caused to undergo variable length encoding by using, e.g., two-dimensional Huffman code, etc. The variable length encoded data thus obtained is taken out from an output terminal 9.

In this case, 0 to 15 of quantizer numbers QNo of the quantization table shown in FIG. 3 correspond to 16 estimators $20_1, 20_2, \ldots, 20_{16}$. For example, the estimator $20_1$ estimates whether or not total code quantity when data is quantized by the quantizer of the quantizer number QNo=0 in video segment units serving as the first data range to allow it to undergo variable length encoding is a predetermined reference value Rf or more. Moreover, respective data of the quantization table of FIG. 3 respectively indicate quantization steps with respect to respective area Nos. 0 to 7 when respective coefficient data of spectrum data of DCT block (8×8 in this embodiment) from the DCT circuit 2 as described above are caused to undergo area division as shown in FIGS. 4A and 4B.

For example, when class number 0 is designated by activity code AT inputted from the class designation circuit 30, quantization steps with respect to respective coefficient data shown in FIG. 4A are such that the quantization step is "4" within the range of area Nos. 0 to 2 of the estimator $20_1$ (quantizer number QNo=0), the quantization step is "8" within the range of area numbers 3 and 4 of the estimator $20_1$, the quantization step is "16" within the range from area Nos. 5 to 7 of the estimator $20_1$, the quantization step is "4" within the range from area Nos. 0 to 3 of the estimator $20_2$ (quantizer No. QNo=1), the quantization step is "8" within the range of area Nos. 4 and 5 of the estimator $20_2$, and the quantization step is "16" within the range of area numbers 6 and 7 of the estimator $20_2$ . . .

Figure 5:
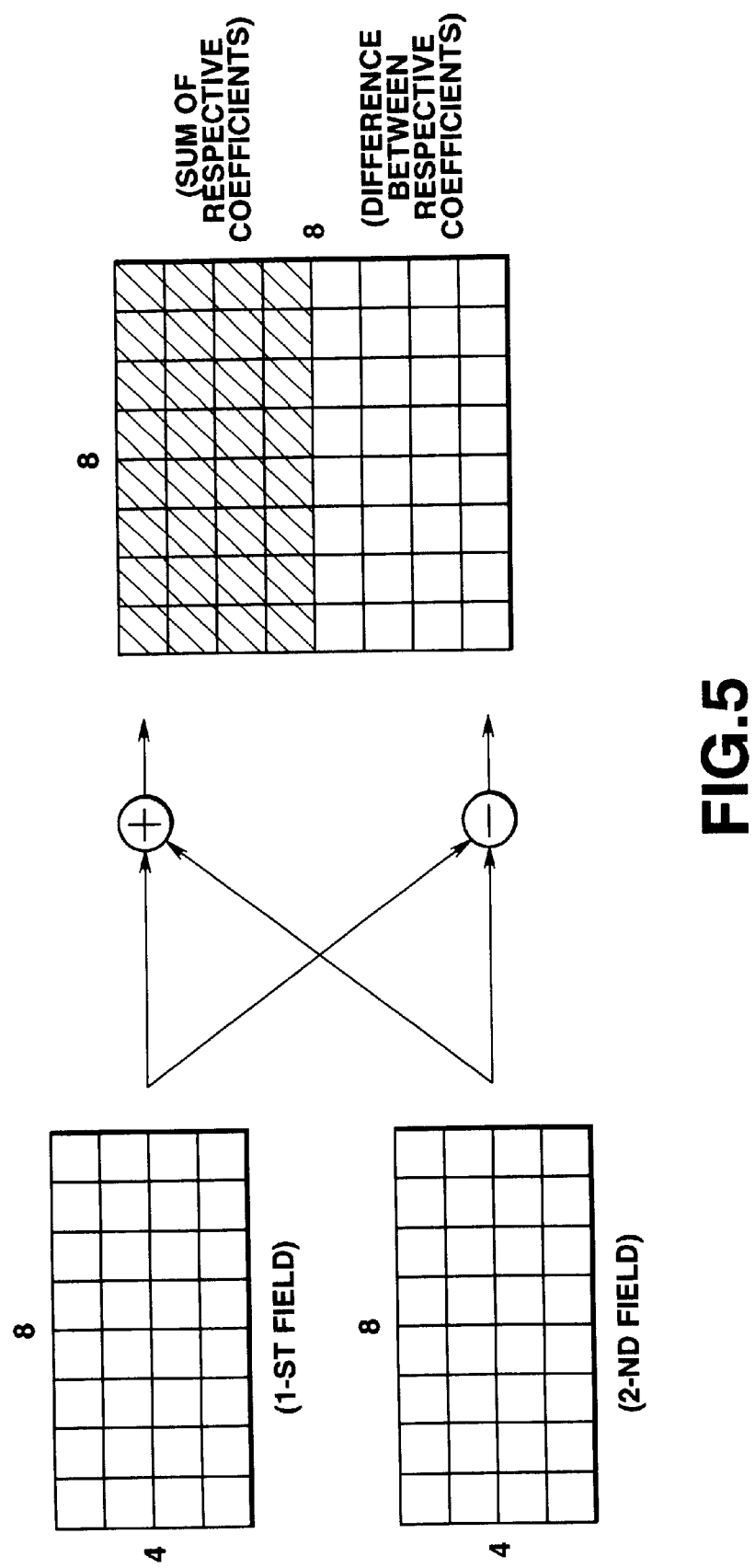
FIG. 5 is a view showing an example of processing of motion mode DCT coefficients.

As is clear from FIG. 3, according as the quantizer No. QNo becomes smaller, the quantization step becomes larger. As a result, data is coarsely quantized. Further, class Nos. 0 to 3 are designated by the activity code AT outputted every DCT block by the class designation circuit 30. In the example of FIG. 3, according as the class No. becomes larger, the quantization step becomes larger. The reason why two kinds of Tables exist as shown in FIGS. 4A and 4B in determining the area No. is that when data which has been caused to undergo DCT blocking is subjected to DCT transform processing at the DCT circuit 2, either one of two modes (motion mode and stationary mode) is determined with respect to the frame at motion detecting circuit which will be described later to carry out DCT transform processing in the state where blocking which is transform unit at the block of (8×8) (stationary mode) and blocking at the block of (2×4×8) (motion mode) are caused to be different from each other. Namely, with respect to respective blocks of (8×8) within the video segment (5 MB in this embodiment), either one of the stationary mode and the motion mode is judged by motion detection prior to DCT transform processing at the DCT circuit 2. Thus, blocked data are caused to undergo DCT transform processing in any either one mode by its result. As shown in FIG. 5, in the stationary mode, one block consists of a DC component and 63 AC components. On the other hand, in the motion mode, each of two (4×8) blocks consists of a DC component and 31 AC components. The detail will be described later.

With respect to the class number 3, in the case where the absolute value of DCT coefficient is above 255, that coefficient value is halved (is changed into ½) by 1 bit shift called initial shift prior to quantization. For this reason, it can be considered that the quantization step is doubled. Respective coefficient data prior to quantization are indicated by 9 bit data in the case where flag bit (one bit) is excluded. However, since only 8 bits are prepared with respect to values of non-zero coefficients in the variable length encoding of the succeeding stage, coefficients having value m at the 9-th bit (MSB) (DCT coefficients above 255) fall within 8 bits by this initial shift.

The quantizing circuit 7 includes quantization table of FIG. 3. In this case, the quantizer No. QNo is selected in video segment units corresponding to the first data range, and the class No. is selected in DCT block units corresponding to the second data range. Thus, the input DCT coefficient data are quantized by quantization steps with respect to the respective area numbers 0~7 of inputted DCT coefficient data. The quantized coefficient data thus obtained is sent to the variable length encoding circuit 8.

In the embodiment of this invention, the predetermined reference value Rf of the estimators $20_1$, $20_2$, . . . , $20_N$ and threshold values $Th_1$, $Th_2$, $Th_3$ of class designation of the class designation circuit 30 are changed in dependency upon the compression factor. In more practical sense, as shown in FIG. 1, information of desired compression factor is given to a compression factor table 12 through a terminal 11 to send reference value Rf and threshold values $Th_1$, $Th_2$, $Th_3$ different (changing) in dependency upon this compression factor to the estimators $20_1$, $20_2$, . . . , $20_N$ and class designation circuit 30. It is to be noted that only one of these values, e.g., reference value Rf may be changed in dependency upon the compression factor.

Figure 6:
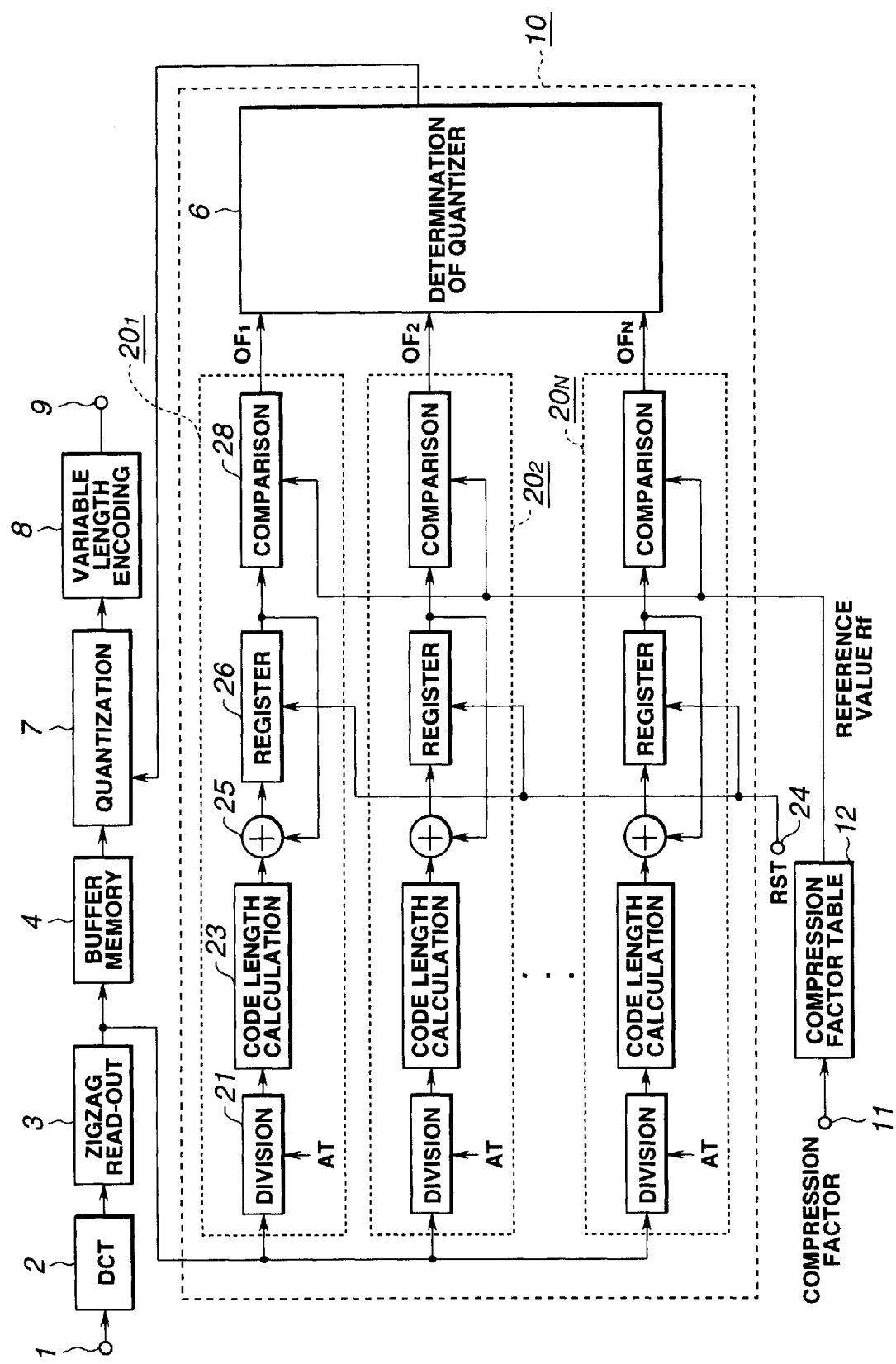
FIG. 6 is a block circuit diagram for explaining an actual example of code quantity estimation section of the embodiment of this invention.

FIG. 6 is a block circuit diagram showing an example of the data encoding apparatus showing the internal of the code quantity estimation section 10, particularly estimators $20_1$, $20_2$, . . . , $20_N$. In this FIG. 6, DCT coefficient data outputted from the zigzag read-out circuit 3 is sent to respective dividers 21 of the estimators $20_1$, $20_2$, . . . , $20_N$ of the code quantity estimation section 10. In this case, since the internal structures of the respective estimators $20_1$, $20_2$, . . . , $20_N$ are all the same, explanation will be given in connection with respective portions (components) within one estimator $20_1$ in the state where reference numerals are respectively attached thereto.

The dividers 21 respectively include quantization tables of quantizer numbers QNo corresponding to respective estimators $20_1$, $20_2$, . . . , $20_N$. Each divider is adapted so that class is designated every DCT blocks by the above-described activity code AT and the input data is divided by quantization step corresponding to the area number of inputted DCT coefficient data. Output from the divider 21 is sent to a code (word) length calculating circuit 23, at which code length when the data is caused to undergo the variable length encoding is determined. The code length data thus obtained is sent to an accumulator composed of an adder 25 and a register 26, at which they are accumulatively added. The accumulated value thus obtained is sent to a comparison circuit 28. The register 26 is reset by reset signal RST from a terminal 24 every predetermined buffer quantity units corresponding to the first data range, e.g., the video segment unit. At the comparator 28, the accumulated value from the register 26 and the reference value Rf are compared with each other to produce output OF of "H" level, e.g., output $OF_1$ in the case of the estimator $20_1$ when the accumulated value reaches the reference value Rf or more. Outputs from the respective estimators $20_1$, $20_2$, . . . , $20_N$ are sent to the quantizer determination circuit 6, at which the maximum quantizer number QNo which does not exceed the reference value Rf is selected.

In this case, different values are read out from the compression factor table 12 in dependency upon compression factor as the reference value Rf and are sent to comparators 28 of the respective estimators $20_1$, $20_2$, . . . , $20_N$. In this case, if the reference value Rf is set to smaller value, total code quantity after quantization becomes smaller, thus making it possible to increase the compression factor. Accordingly, it is sufficient to constitute the compression factor table 12 so that according as the compression factor from the terminal 11 becomes higher, smaller reference value Rf is selected. It is to be noted that the fact that the compression factor is high means that n is large in the case of 1/n compression and data total quantity after undergone encoding becomes lesser.

A more practical example in which the threshold value of class designation is changed in dependency upon the compression factor will now be described with reference to FIGS. 7 and 8.

As described above, in the case of the format adapted for determining quantization step of the quantizing circuit 7 by the quantizer number QNo and class number, it is slightly insufficient for changing the compression factor to vary reference value Rf of the estimators $20_1, 20_2, \ldots, 20_N$ of the code quantity estimation section 10 to change quantizer number QNo to be selected. Also with respect to class number, it is desirable to select class number in which the quantization step becomes larger when the compression factor is increased. In view of the above, it is desirable to change threshold values $Th_1, Th_2, Th_3$ for class designation of the class designation circuit 30 in dependency upon the compression factor.

Figure 7:
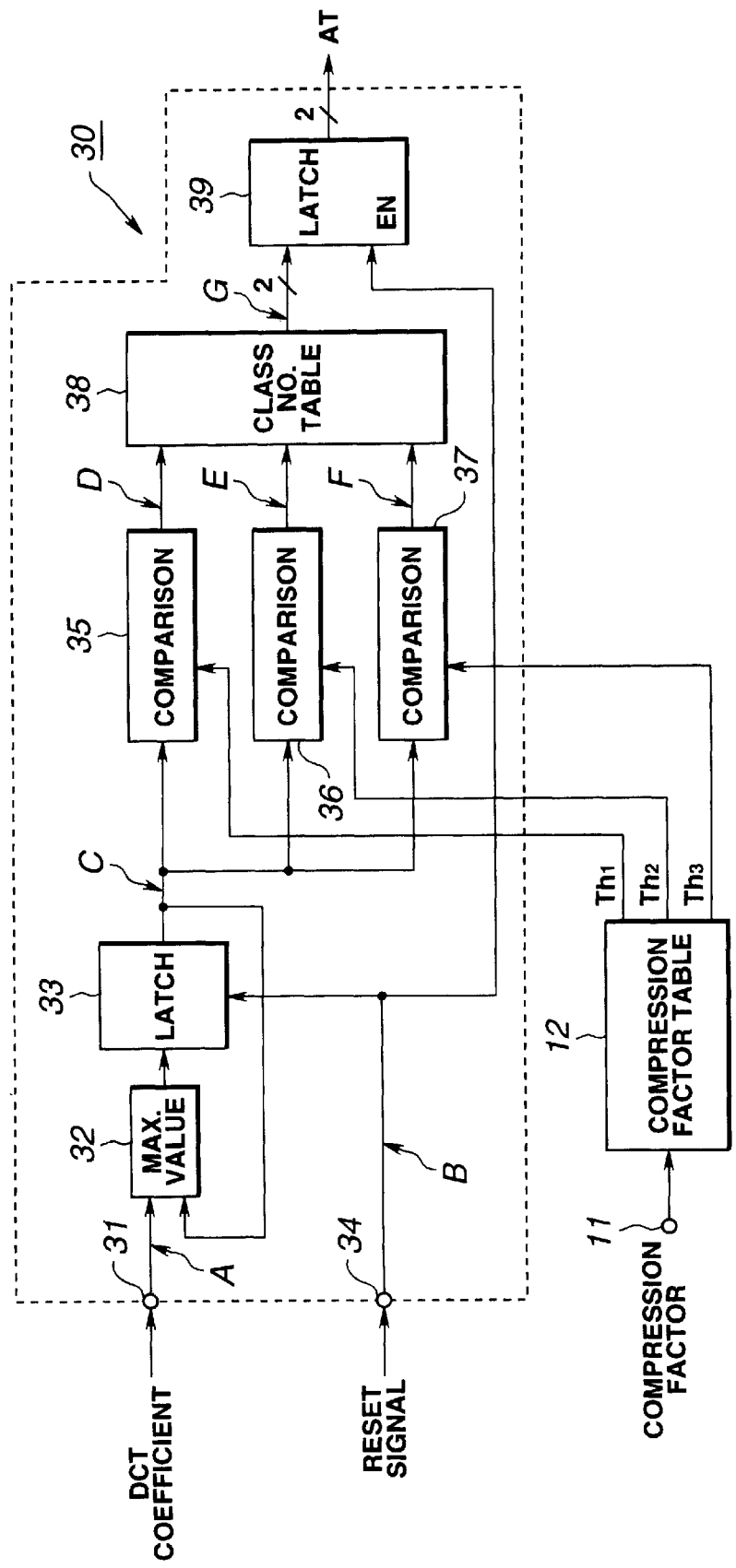
FIG. 7 is a block circuit diagram for explaining an actual example of class designation circuit of the embodiment of this invention.

FIG. 7 shows a more practical example of the configuration of the class designation circuit 30, and FIG. 8 shows signals of respective portions of FIG. 7. An input terminal 31 of FIG. 7 is supplied with absolute values of DCT coefficients, particularly coefficients of AC components from the DCT circuit 2 as indicated by A of FIG. 8, for example. This input DCT coefficient data is sent to a maximum value detection circuit 32, at which it is compared with output value of the latch circuit 33. As a result, a larger value is sent to the latch circuit 33, and is latched thereat. Thus, maximum value output as indicated by C of FIG. 8 is obtained from the latch circuit 33. The latch circuit 33 is supplied with a reset signal as indicated by B of FIG. 8 of, e.g., the DCT block period from a terminal 34. The maximum value output from the latch circuit 33 is sent to respective three comparators 35, 36, 37, at which it is compared with the respective threshold values $Th_1, Th_2, Th_3$. Thus, comparison outputs as indicated at D, E, F of FIG. 8 are respectively outputted from the comparators 35, 36, 37. In the example of FIG. 7, when output value of the latch circuit 33 is larger than the threshold values $Th_1, Th_2, Th_3$, comparison outputs change from 0 to 1. These comparison outputs D, E, F are sent to a class number table 38, whereby class number output as indicated at G of FIG. 8 is sent from the class number table 38 to a latch circuit 39. An enable terminal EN of the latch circuit 39 is supplied with the reset signal B from the terminal 34. Thus, class number at pulse input timing of this reset signal is latched, and is outputted as the above-described activity code AT. By comparing absolute values of AC components of input DCT coefficients by three threshold values $Th_1, Th_2, Th_3$ in this way, any one of class numbers 0 to 3 of four stages is selected.

In this case, the respective threshold values $Th_1, Th_2, Th_3$ are values changing in dependency upon a desired compression factor. For example, when the respective threshold values $Th_1, Th_2, Th_3$ are set to smaller value, outputted class number becomes larger. As a result, the quantization step becomes larger and the compression factor becomes higher. These threshold values $Th_1, Th_2, Th_3$ are read out from the compression factor table 12 in dependency upon the compression factor from the terminal 11, and are sent to respective comparators 35, 36, 37.

A more practical example of the reference value Rf and respective threshold values $Th_1, Th_2, Th_3$ with respect to the compression factor in such compression factor table 12 is shown in FIG. 9. FIG. 9A shows the reference value Rf when the compression factor is set to $1/5, 1/10, 1/20$, and FIG. 9B shows the respective threshold values $Th_1, Th_2, Th_3$ when the compression factor is set to $1/5, 1/10, 1/20$. In the more practical example of FIG. 9B, the maximum value of DCT coefficients delivered to the input terminal 31 is set to 512. In addition to the above, the predetermined reference value Rf and the respective threshold values $Th_1, Th_2, Th_3$ may be always selected in dependency upon the compression factor.

While class number is determined by output result of three comparison circuits 35, 36, 37 in the above-described class designation circuit 30, the reason why such determination method is employed is that degree of fineness of video segment content block is ordinarily represented by class numbers of 4 stages. This invention can cope with not only class numbers of four stages, but also class number selection of plural stages. In that case, it is sufficient to increase or decrease the number of comparison circuits in dependency upon the number of stages, and to prepare compression factor table 12 having a table such that predetermined threshold values can be respectively inputted to the comparison circuits. Moreover, class numbers may be set to predetermined values by predetermined compression factor. As DCT coefficients inputted to the class designation circuit 30, even in the case where values except for absolute values of coefficients of AC components as described above are inputted, the class designation circuit 30 of this invention can be applied. Namely, also in the case where values such as difference between the maximum value and the minimum value of AC coefficients, n-th root of AC coefficients, etc. and coefficient of DC component are inputted to the class designation circuit 30, this invention can be applied.

A recording/reproducing apparatus for digital information data constituted by using the above-described data encoding method or the data encoding apparatus of the embodiment of this invention will now be described with reference to FIG. 10.

Figure 10:
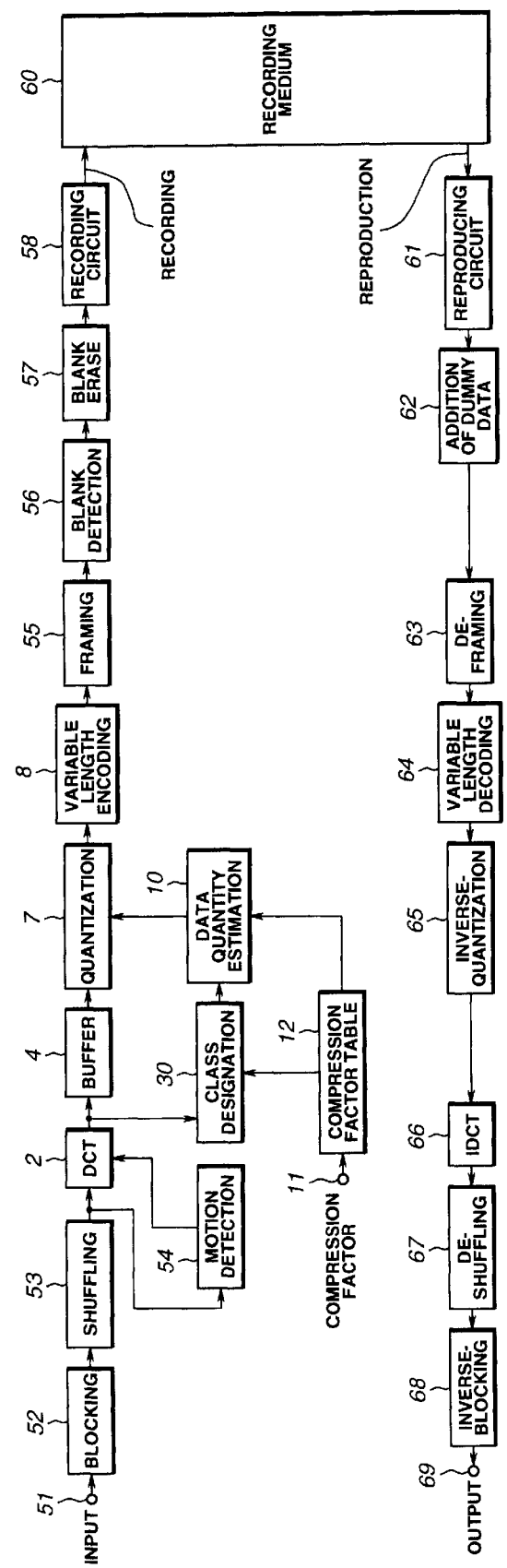
FIG. 10 is a block diagram showing outline of the configuration of a digital information data recording/reproducing apparatus to which the embodiment of this invention is applied.

In FIG. 10, an input terminal 51 is supplied with video data, e.g., in order of interlace scanning caused to be in digital form. This input video data is sent to a blocking circuit 52, at which it is transformed into data of the structure of, e.g., DCT block of 8×8 samples which is the basic unit of DCT. By six (6) blocks in total of luminance four (4) blocks and two color (respective one) difference blocks of this DCT block, a single macro block is constituted. Namely, blocks of (4×8) at the same position in point of time of first and second fields continuous in point of time are combined. Thus, block of (8×8) is formed. Output from the blocking circuit 52 is delivered to a shuffling circuit 53, at which the processing for allowing spatial position to be different from the original position with plural macro blocks MB being as unit, i.e., shuffling is carried out. This is carried out in order to prevent that errors concentrate by drop-out, flaw on the tape or head clog, etc. so that deterioration of the picture quality becomes conspicuous. Output from this shuffling circuit 53 is sent to DCT (Discrete Cosine Transform) circuit 2 and a motion detecting circuit 54.

The motion detecting circuit 54 is supplied with respective blocks of (8×8) of plural macro blocks (In this embodiment, one video segment is constituted by five (5) macro blocks (MB) and encoding is carried out at the DCT circuit 2 in this unit at times subsequent thereto) shuffled at the shuffling circuit 53 of the preceding stage as described above to judge that corresponding mode is either the motion mode or the stationary mode. This is because even if inputted blocks are caused to uniformly undergo DCT processing at the DCT circuit 2 for the interlace scanning when object is moving or camera is panning or zooming, etc. (when the operation mode is the motion mode), there is the possibility that energy is dispersed so that the compression efficiency is lowered. For this reason, in such a case, block of (8×8) is divided into respective blocks of (4×8) at the first field and the second field to implement DCT processing at the DCT circuit 2 with respect to respective blocks of (4×8) to thereby prevent lowering of the compression efficiency. As a method of selection of respective modes of respective blocks of (8×8) in the motion detecting circuit 54, various methods are conceivable. As an example, there is mentioned a method of carrying out selection of the motion mode and the stationary mode on the basis of coefficient data in the vertical direction when respective blocks are caused to undergo Hadamard transform processing. In addition, sum of absolute values of differences between the first and second fields may be compared with a predetermined threshold value, thereby making it possible to carry out selection of the motion mode and the stationary mode.

When any one of the motion mode and the stationary mode is judged with respect to respective blocks of (8×8) at the motion detecting circuit 54, DCT processing is carried out with respect to respective blocks inputted at the DCT circuit 2 in correspondence with the selected mode. In the stationary mode, each of blocks of (8×8) of respective video segments consists of single DC component and 63 AC components (see FIG. 2). On the other hand, when the operation mode is the motion mode, calculation (operation) of sum and difference with respect to coefficients of the same order of respective blocks each constituted by single DC component and 31 AC components is carried out with respect to respective two blocks of (4×8) to reconstruct them into blocks of (8×8). Thus, DCT processing corresponding to respective modes are carried out at the DCT circuit 2.

The configuration from the DCT circuit 2 to the variable length encoding circuit 8 corresponds to the configuration of the data encoding apparatus of the FIG. 1 mentioned above, the detailed description is omitted. Also in this case, however, as described above, compressed data in which total code quantity has been changed in dependency upon the compression factor is taken out from the variable length encoding circuit 8.

The compressed data from the variable length encoding circuit 8 is sent to a framing circuit 55. At the framing circuit 55, compressed data of, e.g., 5 macro blocks are packed into 5 synch blocks of 25 Mbps in accordance with a predetermined format to implement framing processing for forming recording data thereto. This processing is a processing also including allocation of data between respective macro blocks such that data overflowing from a certain macro block is shifted to the space (blank) portion of any other macro block within video segment consisting of 5 macro blocks. Even if such packing is carried out, blank portion or invalid data portion exists within sync block. Particularly, in the system of arbitrarily changing the compression factor as in the embodiment of this invention, total code quantity of compressed data is changed. The total code quantity becomes less when the compression factor is increased. As a result, the blank portion or the invalid data portion within the sync block would be increased.

In view of the above, the blank portion within the sync block of data from the framing circuit 55 is detected by a blank detecting circuit 56 to erase the blank portion detected by the next blank erasing circuit 57 thereafter to record data with respect to a recording medium 60 such as hard disc, etc. by a recording circuit 58.

The data recorded on the recording medium 60 is reproduced by a reproducing circuit 61 to add dummy data to the erased blank portion by a dummy data adding circuit 62 to send it to a de-framing circuit 63 to implement processing opposite to the framing processing of the framing circuit 55 to send it to a variable length decoding circuit 64. The variable length decoding circuit 64, an inverse-quantizer 65, an IDCT (Inverse Discrete Cosine Transform) circuit 66, a de-shuffling circuit 67 and an inverse-blocking circuit 68 respectively implement processing opposite to the respective processing of the variable length encoding circuit 8, the quantizing circuit 7, the DCT circuit 2, the shuffling circuit 53 and the blocking circuit 52. Thus, decoded video data corresponding to input video data to the input terminal 51 is outputted from the inverse-blocking circuit 68, and is taken out through an output terminal 69.

Meanwhile, with respect to the blank detecting circuit 56 and the blank erasing circuit 57, e.g., digital information data recording and reproducing apparatus that the applicant of this application has already proposed in the specification and the drawings of the Japanese Patent Application No. 91532/1996 may be used. This digital information data recording and reproducing apparatus will be described below with reference to FIGS. 11 to 16.

Figure 11:
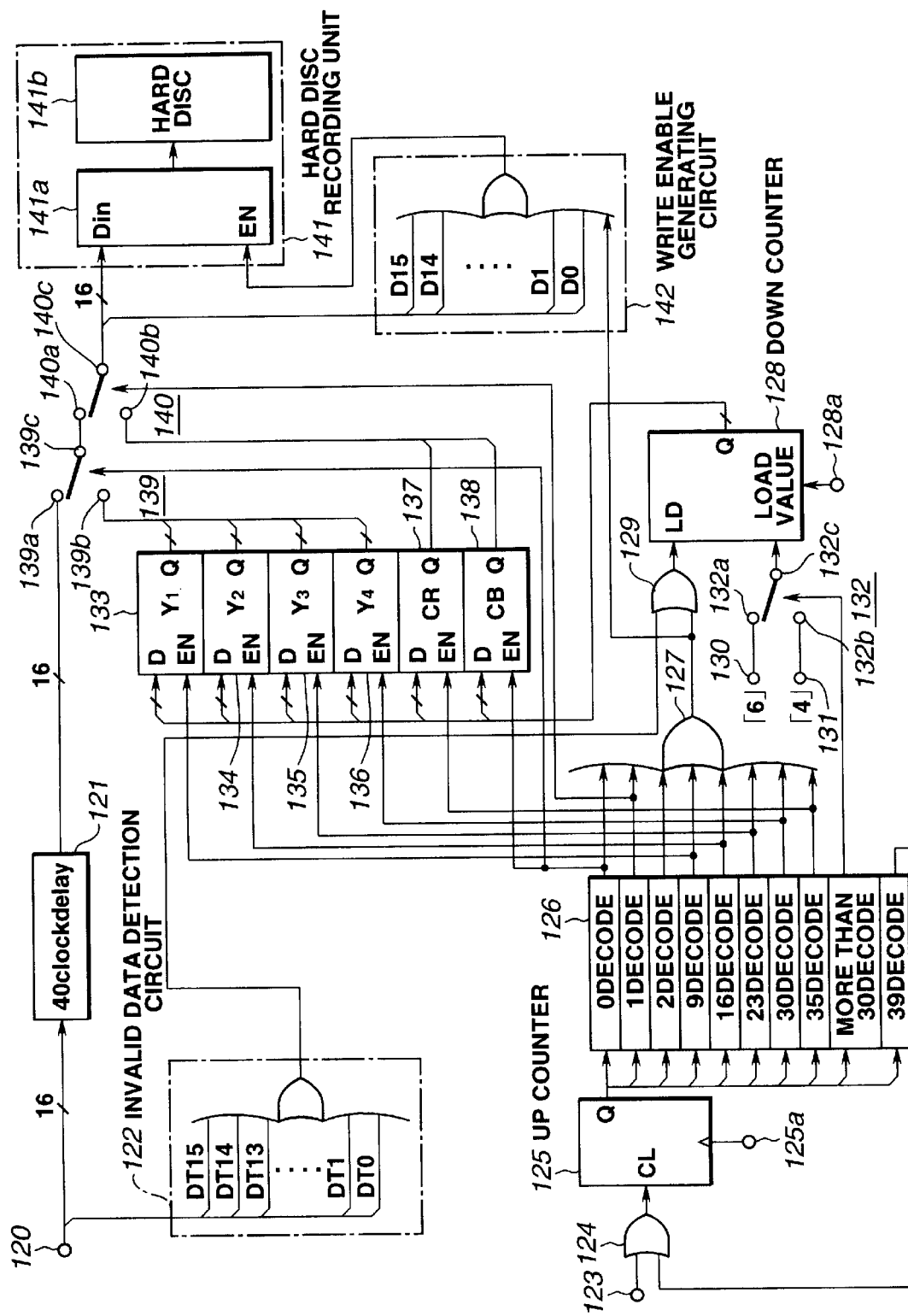
FIG. 11 is a block circuit diagram showing an example of a more practical configuration of a digital information data recording apparatus to which the embodiment of this invention is applied.

FIG. 11 shows an example of the essential part of the digital information data recording apparatus corresponding to the configuration from the blank detecting circuit 56 to the recording medium 60 of the FIG. 10 mentioned above. In this example, an input terminal 120 of FIG. 11 is supplied with framing data of the fixed length format obtained at the output side of the framing circuit 55 of the FIG. 10 mentioned above.

Figures 12A, 12B:
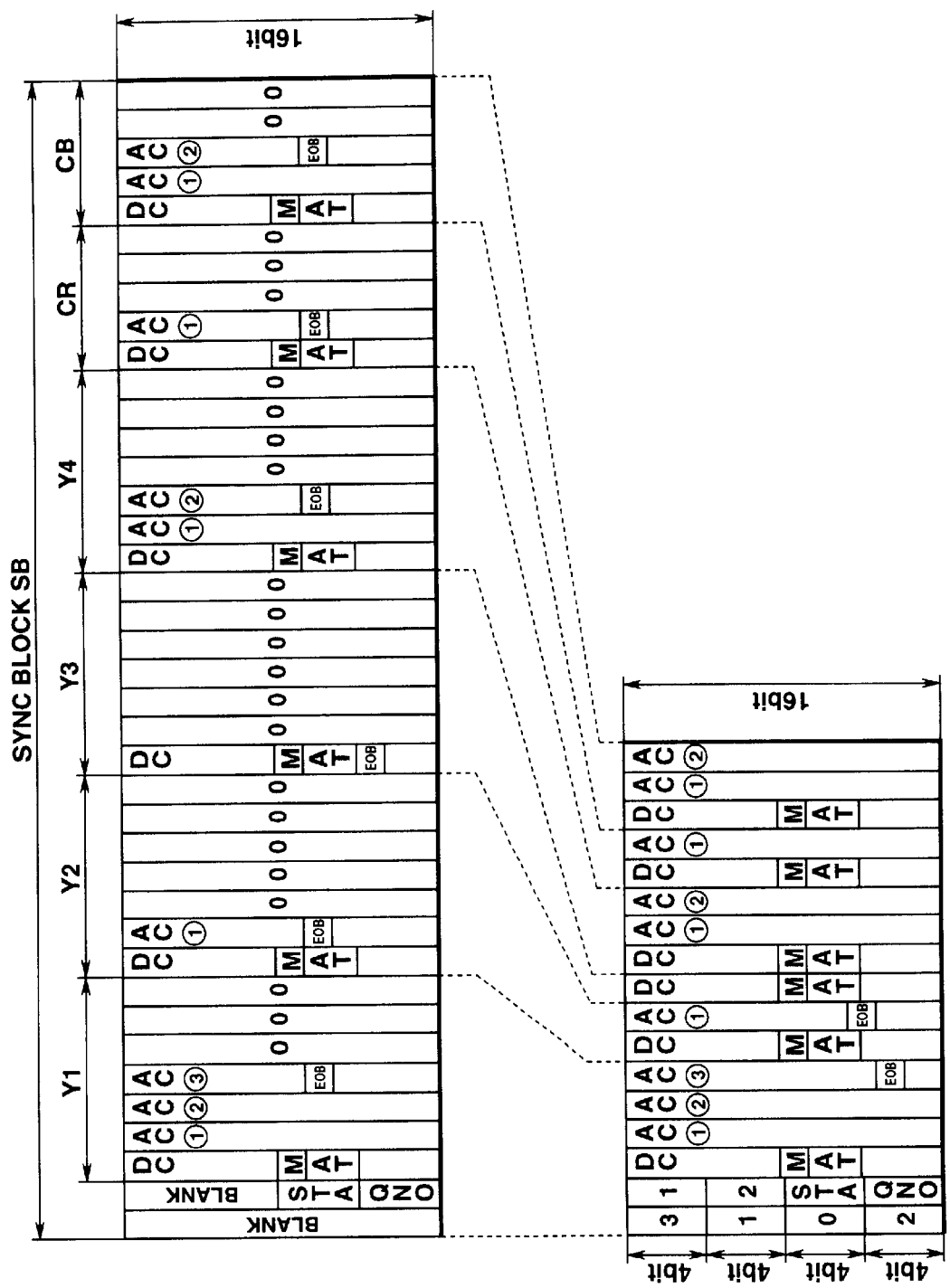
FIG. 12 is a view showing an example of input signal and recording signal of the digital information data recording apparatus of FIG. 11.

For simplifying explanation in this example, framing data of the fixed length format, i.e., data of sync block SB as shown in FIG. 12A is assumed to be delivered to the input terminal 120.

In the fixed length format shown in FIG. 12A, one sync block SB consists of 40 data of 16 bits, wherein the first one data of the sync data portion is blank, and the next data is such that 8 bits are blank and error information STA and quantizer number QNo are respectively inserted into the next 4 bits and the next 4 bits succeeding (subsequent) thereto. 28 data are four Y blocks $Y_1$, $Y_2$, $Y_3$, $Y_4$ each comprised of 7 data of luminance signal, and respective next 5 data are CR block and CB block of color difference signal.

In this FIG. 12, "0" after end of block EOB are invalid data. In this case, in this example, such an approach is assumed to initially first write "0" in advance over the entirety thereafter to rewrite them by valid data.

Framing data of the fixed length format, as shown in FIGS. 12A and 13B, delivered to this input terminal 120 is delivered to a 40 clock elongation (delay) circuit 121 for carrying out delay by time necessary for signal processing, and is delivered to an invalid data detection circuit 122 for detecting invalid data or the blank. This invalid data detection circuit 122 corresponds to the blank detecting circuit 56 of FIG. 10.

This invalid data detecting circuit 122 is adapted so that when 16 bits of 1 data are all "0", it judges that data as invalid data. Accordingly, in this example, a signal indicated at G of FIG. 13 is obtained at the output side of this invalid data detecting circuit 122.

Moreover, in FIG. 11, buffer unit pulse occurring once every 40 clocks which falls in response to the beginning portion of sync block SB as shown in FIG. 13A, for example, is delivered to a buffer unit pulse input terminal 123.

The buffer unit pulse delivered to this buffer unit pulse input terminal 123 is delivered to clear terminal CL of an up-counter 125 through an OR gate circuit 124. A clock terminal 125a of this up-counter 125 is supplied with a clock signal. Thus, a count signal shown in FIG. 13C is obtained at output terminal Q of this up-counter 125.

The count signal obtained at the input terminal Q of this up-counter 125 is delivered to a decoder 126 at which "0", "1", "2", "9", "16", "23", "30", "35", "More than 30" and "39" decode signals are obtained. The "39" decode signal of this decoder 126 is delivered to clear terminal CL of this up-counter 125 through the OR gate circuit 124 to clear this up-counter 125 every 40 clocks.

Respective decode signals of "0", "1", "2", "9", "16", "23", "30" and "35" of this decoder 126 are delivered to an OR gate circuit 127 to obtain a mask signal shown in FIG. 13D at the output side of this OR gate circuit 127. Even if the invalid data detecting circuit 122 judges the portion where this mask signal exists as invalid data, it is assumed to be dealt as valid data.

The mask signal shown in FIG. 13D obtained at the output side of the OR gate circuit 127 is delivered to load terminal LD of a down-counter 128 of FIG. 11 through an OR gate circuit 129, and an invalid data detection signal shown in FIG. 13G of the invalid data detection circuit 122 is delivered to this load terminal LD through the OR gate circuit 129. Accordingly, a load signal shown in FIG. 13H is delivered to the load terminal LD of this down-counter 128.

This down-counter 128 sets load value every time load signal is caused to be at high level "1". This load value is "6" when the count value of the up-counter 125 is less than "30", and is "4" when this count value is "30" or more.

Namely, load value "6" is inputted to an input terminal 130, load value "4" is inputted to an input terminal 131, this input terminal 130 is connected to one fixed contact 132a of a selector (changeover) switch 132, the input terminal 131 is connected to the other fixed contact 132b of the selector switch 132, a movable contact 132c of this selector switch 132 is switched by the "more than 30" decode signal shown in FIG. 13E of the decoder 126, and load value shown in FIG. 13F obtained at this movable contact 132c is delivered to the load value input terminal of this down-counter 128. Reference numeral 128a denotes a clock input terminal supplied with a clock signal for carrying out down count operation.

At this output terminal Q of the down-counter 128, count value shown in FIG. 13I is obtained. Count value obtained at the output terminal Q of this down-counter 128 is delivered to respective data terminals D of latch circuits 133, 134, 135, 136, 137 and 138 for latching valid data length. Moreover, "9" decode signal shown in FIG. 13J of the decoder 126 is delivered to enable terminal EN of the latch circuit 133 for latching valid data length of $Y_1$ block to latch valid data length of the $Y_1$ block at this latch circuit 133.

"16" decode signal shown in FIG. 13K of the decoder 126 is delivered to enable terminal EN of the latch circuit 134 for latching valid data length of $Y_2$ block to latch valid data length of $Y_2$ block at this latch circuit 134.

"23" decode signal shown in FIG. 13L of the decoder 126 is delivered to enable terminal EN of the latch circuit 135 for latching valid data length of $Y_3$ block to latch valid data length of the $Y_3$ block at this latch circuit 135.

"30" decode signal shown in FIG. 13M of the decoder 126 is delivered to enable terminal EN of the latch circuit 136 for latching valid data length of $Y_4$ block to latch valid data length of $Y_4$ block at this latch circuit 136.

Moreover, "35" decode signal shown in FIG. 13N of the decoder 126 is delivered to enable terminal EN of the latch circuit 137 for latching valid data length of CR block to latch valid data length of CR block at this latch circuit 137.

"0" decode signal shown in FIG. 13O of the decoder 126 is delivered to enable terminal EN of the latch circuit 138 for latching valid data length of CB block to latch valid data length of CB block at this latch circuit 138.

Figures 14A, 14B, 14C, 14D, 14E, 14F, 14G:
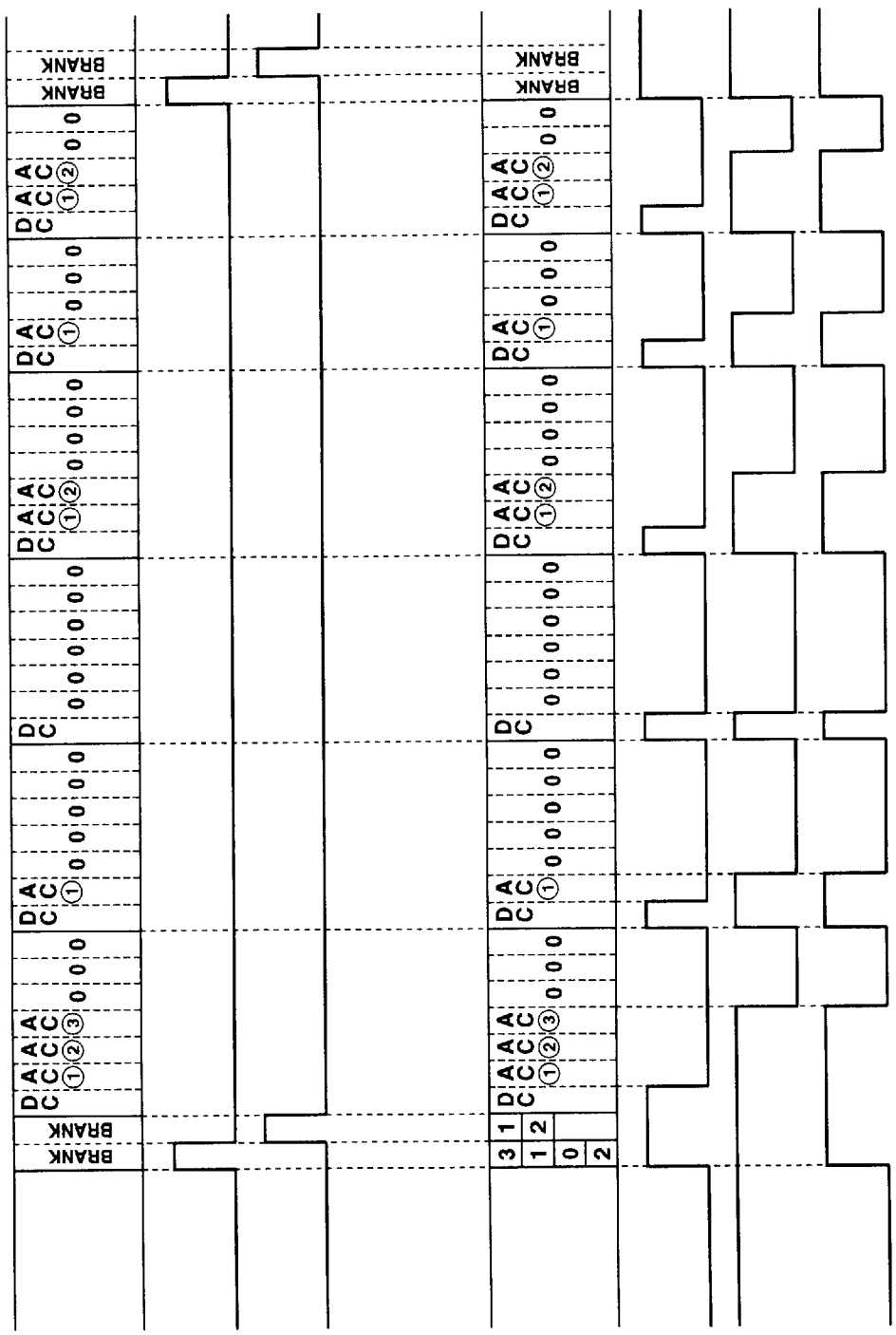
FIG. 14 is a timing chart for explaining the operation of the digital information data recording apparatus of FIG. 11.

Moreover, in this example, input signal delayed by 40 clocks shown in FIG. 14A, which is obtained at the output side of 40 clock delay circuit 121, is delivered to one fixed contact 139a of a selector switch 139, and valid data length headers of $Y_1$, $Y_2$, $Y_3$ and $Y_4$ blocks shown in FIGS. 13P, Q, R and S obtained at the output side of the latch circuits 133, 134, 135 and 136 are delivered to the other fixed contact 139b of this selector switch 139.

A movable contact 139c of this selector switch 139 is caused to undergo switching control by "0" decode signal shown in FIG. 14B of the decoder 126 to connect it to the other fixed contact 139b only for one bit time period during which this "0" decode signal exists to insert valid data length headers "3", "1", "0" and "2" of the $Y_1$, $Y_2$, $Y_3$ and $Y_4$ blocks, and to connect this movable contact 139c to one fixed contact 139a for other time period.

A signal obtained at the movable contact 139c of this selector switch 139 is delivered to one fixed contact 140a of a selector switch 140, and valid data length headers of CR and CB blocks shown in FIGS. 13T and U obtained at the output side of the latch circuits 137 and 138 are delivered to other fixed contact 140b of this selector switch 140.

A movable contact 140c of this selector switch 140 is caused to undergo switching control by "1" decode signal shown in FIG. 14C of the decoder 126 to connect it to the other fixed contact 140b only for one bit time period during which this "1" decode signal exists to insert valid data length headers "1" and "2" of CR and CB blocks, and to connect this movable contact 140c to one fixed contact 140a for other time period.

Sync block SB to which $Y_1$, $Y_2$, $Y_3$ and $Y_4$ block valid data length headers "3", "1", "0" and "2" and CR and CB block valid data length headers "1" and "2" are added to the initial blank portion of sync block SB shown in FIGS. 12A and 13B as in the case of signal shown in FIG. 14D obtained at the movable contact 140c of this selector switch 140 is delivered to data input terminal $D_{in}$ of a buffer memory 141a of a hard disc recording unit 141, and is delivered to a write enable signal generating circuit 142 which obtains a write enable signal for controlling write operation of the buffer memory 141a.

This hard disc recording unit 141 is adapted so that recording data is recorded at a predetermined position of a hard disc 141b every time recording data of a predetermined quantity is stored into the buffer memory 141a.

This write enable signal generating circuit 142 serves to take OR (logical sum) of invalid data determination signal shown in FIG. 14F in which 16 bits of data of input signal are all at low level "0" and mask signal shown in FIG. 14E obtained at the output side of the OR gate circuit 127. At the output side of this write enable signal generating circuit 142, a write enable signal shown in FIG. 14G is obtained.

The write enable signal obtained at the output side of this write enable signal generating circuit 142 is delivered to write enable signal input terminal EN of the buffer memory 141a of the hard disc recording unit 141.

This buffer memory 141a serves to store input signal delivered to data input terminal $D_{in}$ only when this write enable signal is at high level of "1".

Namely, in this example, when sync block SB delivered to the input terminal 120 was data shown in FIG. 12A, recording data stored into this buffer memory 141a is caused to be a signal consisting of the portions where mask signal to which valid data length header is added exists, valid data portions and other portions from which invalid data has been removed.

Accordingly, in this example, signal shown in FIG. 12B is recorded onto the hard disc 141b. Accordingly, in accordance with this example, invalid data portion in recording data becomes lesser. Thus, capacity of the hard disc can be further advantageously saved (reduced).

In this case, the invalid data detection circuit 122 of the configuration of FIG. 11 corresponds to the blank detecting circuit 56 of FIG. 10, the hard disc recording unit 141 corresponds to the recording circuit 58 and the recording medium 60 of FIG. 10, and the remaining portion of FIG. 11 corresponds to the blank erasing circuit 57 of FIG. 10.

An example of a digital information data reproducing apparatus for reproducing the hard disc 141b recorded by the above-described digital information data recording unit of FIG. 11 will now be described with reference to FIGS. 15 and 16.

Figure 15:
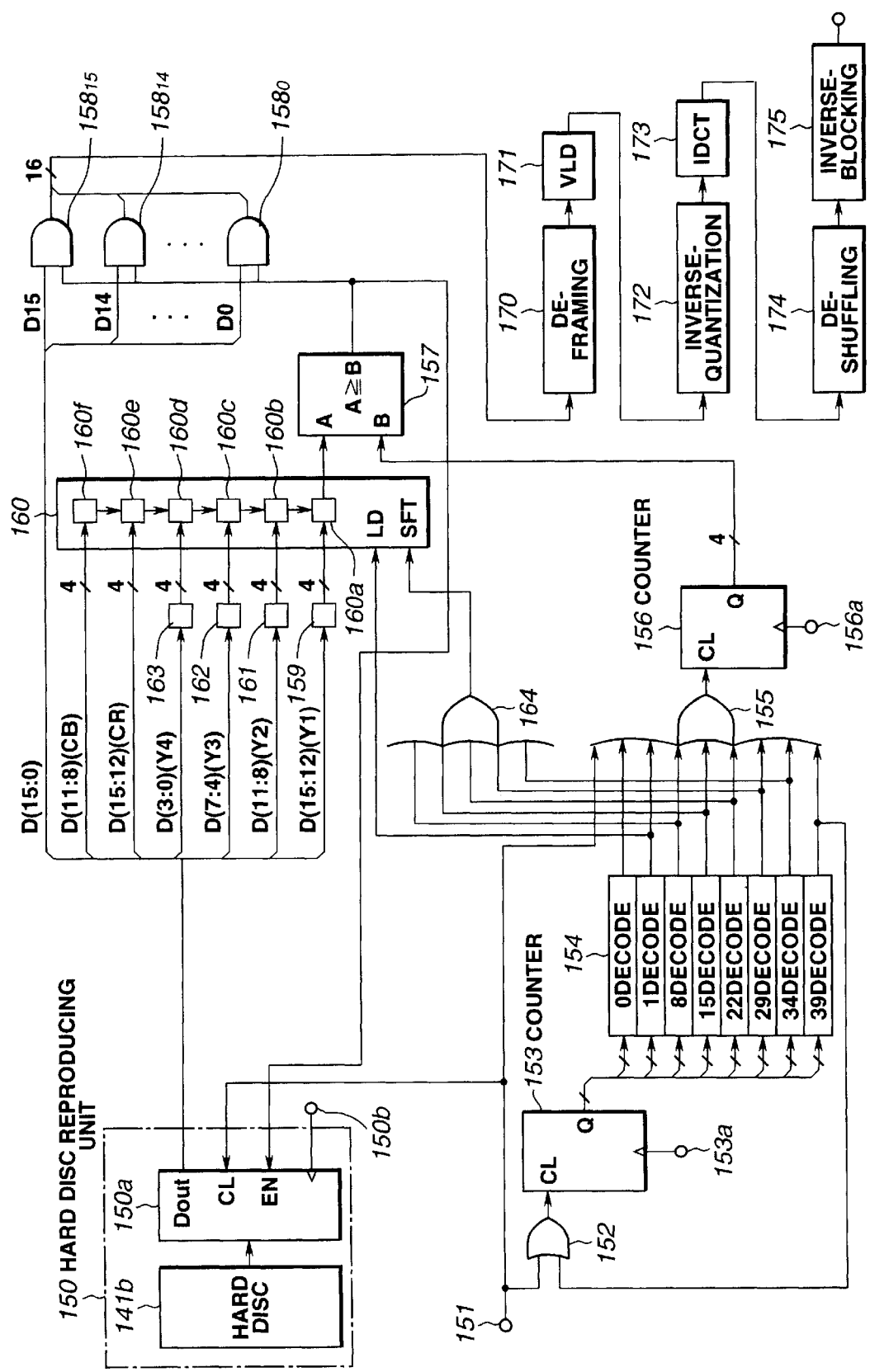
FIG. 15 is a block circuit diagram showing an example of a more practical configuration of a digital information data reproducing apparatus to which the embodiment of this invention is applied.

In FIG. 15, a hard disc reproducing unit 150 is adapted to output a reproduction signal from the hard disc 141b through a buffer memory 150a. This buffer memory 150a is adapted to output one data (16 bits) from data output terminal $D_{out}$ every time clock signal is delivered to a clock terminal 150b when enable signal delivered to the enable terminal EN is at high level "1" from the time when clear signal is delivered to clear terminal CL.

Moreover, a terminal 151 indicates a start signal input terminal supplied with a start signal of reproduction operation shown in FIG. 16A, and serves to deliver start signal delivered to this start signal input terminal 151 to the clear terminal CL of the buffer memory 150a of the hard disc reproducing unit 150, and to deliver this start signal to clear terminal CL of a counter 153 through an OR gate circuit 152.

This counter 153 serves to count clock signal shown in FIG. 16K, and to deliver count signal shown in FIG. 16B obtained at output terminal Q of this counter 153 to a decoder 154 at which decode signals of "0", "1", "8", "15", "22", "29", "34" and "39" are obtained.

The "39" decode signal of this decoder 154 is delivered to the clear terminal CL of the counter 153 through the OR gate circuit 152 to clear this counter 153 every 40 clocks.

Moreover, this start signal, and respective decode signals of "0", "1", "8", "15", "22", "29", "34" and "39" of the decoder 154 are delivered to the input side of an OR gate circuit 155, and clear signal shown in FIG. 16C obtained at the output side of the OR gate circuit 155 is delivered to clear terminal CL of a counter 156.

This counter 156 serves to count clock signal shown in FIG. 16K delivered to a clock input terminal 156a, and serves to deliver count signal shown in FIG. 16D obtained at output terminal Q of this counter 156 to B signal input terminal of a comparator 157 which will be described later.

Moreover, 16 bits $D_0, D_1 \ldots, D_{15}$ of data obtained at data output terminal $D_{out}$ of the buffer memory 150a of the hard disc reproducing unit 150 are respectively delivered to one input terminals of AND gate circuits $158_0, 158_1 \ldots 158_{15}$.

Further, $D_{12}$ to $D_{15}$ bits of 16 bits $D_0, D_1 \ldots D_{15}$ of data obtained at data output terminal $D_{out}$ of this buffer memory 150a are delivered to a first shift register section 160a of a shift register 160 through an 1 clock delay circuit 159, these $D_8$ to $D_{11}$ bits are delivered to a second shift register section 160b of the shift register 160 through an 1 clock delay circuit 161, these $D_4$ to $D_7$ bits are delivered to a third shift register section 160c of the shift register 160 through an 1 clock delay circuit 162, and these $D_0$ to $D_3$ bits are delivered to a fourth shift register section 160d of the shift register 160 through an 1 clock delay circuit 163.

Further, $D_{12}$ to $D_{15}$ bits of 16 bits $D_0, D_1 \ldots D_{15}$ of data obtained at data output terminal $D_{out}$ of this buffer memory 150a are delivered to a fifth shift register section 160e of the shift register 160, and these $D_8$ to $D_{11}$ bits are delivered to a sixth shift register section 160f of the shift register 160.

An "1" decode signal of the decoder 154 shown in FIG. 16E is delivered to load terminal LD of this shift register 160, and valid data length header is delivered to first to sixth shift register sections 160a to 160f when this "1" decode signal is delivered thereto.

In this case, when recording data is data shown in FIG. 12B, "3" of valid data length of $Y_1$ block is delivered to the first shift register section 160a, "1" of valid data length of $Y_2$ block is delivered to the second shift register section 160b, "0" of valid data length of $Y_3$ block is delivered to the third shift register section 160c, "2" of valid data length of $Y_4$ block is delivered to the fourth shift register section 160d, "1" of valid data length of CR block is delivered to the fifth shift register section 160e, and "2" of valid data length of CB block is delivered to the sixth shift register section 160f.

Moreover, this shift register 160 is of a structure in which the first to sixth shift register portions (stages) 160a to 160f are connected in series, and is operative to carry out shift operation by one shift register stage every time shift pulse is delivered to shift pulse terminal SFT so that valid data lengths shown in FIG. 16G obtained at the first shift register section 160a are delivered in succession to A signal input terminal of the comparator 157.

Further, this shift pulse terminal SFT is supplied with shift pulse shown in FIG. 16F obtained at the output side of the OR gate circuit 164 which is supplied, at the input side, with respective "8", "15", "22", "29" and "34" decode signals of the decoder 154.

This comparator 157 serves to make comparison between A signal delivered to A signal input terminal and B signal delivered to B signal input terminal, whereby when A≧B, it provides output of high level "1" to its output side, and when A<B, it provides output of low level "0" thereto as shown in FIG. 16H.

An output signal shown in FIG. 16H of this comparator 157 is delivered to enable terminal EN of the buffer memory 150a, and an output signal of this comparator 157 is delivered to respective other input terminals of 16 AND gate circuits $158_0, 158_1 \ldots 158_{15}$.

Accordingly, at data output terminal $D_{out}$ of this buffer memory 150a, there is obtained a signal caused to have fixed length format of sync bit SB as shown in FIG. 16I and such that valid data of FIG. 12B is inserted and other portions are caused to be DC data. At the output side of these 16 AND gate circuits $158_0, 158_1 \ldots 158_{15}$, there results (is provided) fixed length format sync block SB shown in FIG. 12A in which dummy data "0" are inserted in correspondence with the valid data length as shown in FIG. 16J.

If reproduction signal shown in FIG. 16J obtained at the output side of these 16 AND gate circuits $158_0, 158_1 \ldots 158_{15}$ is delivered to a reproducing unit consisting of a de-framing circuit 170, a variable length decoding circuit 171, an inverse-quantizing circuit 172, an inverse DCT circuit 173, a de-shuffling circuit 174 and an inverse blocking circuit 175, etc., a reproduction signal similar to the prior art can be obtained.

In this case, while such an example to add valid data length header has been described in the above-described more practical example, an approach may be employed to add invalid data length header in place of the above.

Moreover, while data length header is added in the above-described more practical example, it is a matter of course that it is sufficient to detect EOB after reproduction without adding such data length header to find out delimiter of DCT block to insert dummy data at the blank to output it. In addition, while, in the above-described more practical example, invalid data (blank) after framing is detected by judging whether or not all bits of data are at low level "0", it is a matter of course that it is sufficient to detect such invalid data (blank) by any other method.

As explained above, as in the case of, e.g., the format of digital VTR having tape width of ¼ inches, which is so called DV format, in compression-encoding of picture data of fixed compression factor, the compression factor can be easily changed into a desired compression factor. Thus, invalid data portion, i.e., blank portion of code compressed at high compression factor is erased, thereby making it possible to record data with respect to recording medium such as disc, etc. Thus, saving (reduction) of capacity of the media can be made. This is particularly effective or advantageous in the case where media are used in use purposes such as off-line editing, etc. for which high picture quality is not required.

In accordance with the data encoding method and the data encoding apparatus according to this invention as previously explained, in carrying out orthogonal transform processing of input data to allow the transformed data to undergo variable length encoding after undergone quantization, such an approach is employed to estimate total encoded data quantity when undergone variable length encoding on the basis of the orthogonally transformed data to determine quantization step in quantization on the basis of the estimated data quantity and reference value different (changing) in accordance with compression factor so that total quantity of encoded data is changed. Thus, a desired or arbitrary compression factor can be obtained.

Further, in accordance with this invention, in the case of orthogonally transforming input data to allow it to undergo variable length encoding after undergone quantization, such an approach is employed to change, in dependency upon compression factor, threshold value for designation of class which indicates fineness of quantization on the basis of the orthogonally transformed data so that total quantity of encoded data is changed. Thus, compression factor in carrying out data encoding can be changed into a desired compression factor.

In this case, when there is assumed a picture compression format of fixed compression factor such that the input data is picture data, and that in quantizing DCT coefficient data obtained by carrying out Discrete Cosine Transform (DCT) by any one of plural quantizers to allow the quantized data to undergo variable length encoding, an approach is employed to estimate data quantity when undergone quantization and variable length encoding in video segment units of the DCT coefficient data to allow the quantized data to undergo variable length encoding to compare the estimated data quantity with reference value to thereby determine optimum quantizer to compare data of macro block unit of DCT coefficient data with threshold value to thereby determine class for indicating fineness of quantization, the reference value or the reference value and threshold value are changed in dependency upon information of desired compression factor, whereby finally encoded data quantity obtained after undergone compression-encoding is changed. Thus, in data encoding in the picture compression format of fixed compression factor, the compression factor can be easily changed while maintaining compatibility of format.

Further, invalid data portions, i.e., blank portions of codes compressed at a high compression factor are erased, thus making it possible to record data with respect to recording media such as disc, etc. Thus, capacity of the media can be saved (reduced). This is particularly effective or advantageous in the case where such media are used in use purposes such as off-line editing, etc. for which high picture quality is not required.

It is to be noted that this invention is not limited to the above-described embodiments. For example, quantization step determination circuit having quantization table as shown in FIG. 3 may be used in place of quantizer determination circuit 6 to deliver activity code AT (class number) from class designation circuit 30 to this quantization step determination circuit to directly designate quantization step at quantizing circuit 7. Moreover, size of DCT block or size of video segment, etc. is not limited to 8×8 pixels or 5 MB (macro blocks), but may be arbitrarily set. Further, it is a matter of course that 16 of the number of quantizers and/or 4 of the number of designation of classes may be arbitrarily set. Further, while the encoding system by the DCT transform processing has been described in this embodiment, encoding system based on wavelet coefficients by the wavelet transform processing, and/or encoding system in which the wavelet transform processing and any other transform system are combined are effective or advantageous in addition to the above. Further, this invention can be applied also to various encoding systems such as Region Based Coding or the Fractal encoding, etc. In addition, various modifications may be made within the range which does not depart from the gist of this invention.

What is claimed is:

1. A data encoding method, comprising the steps of:

receiving input data;

determining whether said input data should be processed in a motion mode or a stationary mode;

performing an orthogonal transform on said input data to generate orthogonally transformed data in the form of a plurality of data blocks, wherein when said input data is processed in said motion mode the number of data blocks produced is greater than the number of data blocks produced when said input data is processed in said stationary mode;

determining quantization steps on the basis of the orthogonally transformed data and a compression factor indicator, wherein said compression factor indicator is used to set a plurality of threshold values for determining classes of said data blocks on a block-by-block basis, and wherein a quantization step is determined for each said data block according to at least said class corresponding to said data block;

quantizing the orthogonally transformed data according to said quantization steps to generate quantized data; and encoding said quantized data according to a variable length encoding procedure.

2. A data encoding method as set forth in claim 1, wherein said step of performing an orthogonal transform includes performing a Discrete Cosine Transform.

3. A data encoding method as set forth in claim 1, wherein, said step of determining quantization steps includes estimating total code quantity when the orthogonally transformed data is caused to undergo variable length encoding.

4. A data encoding method as set forth in claim 1, wherein, said step of determining quantization steps includes estimating total code quantity when the orthogonally transformed data is quantized by plural quantizers having quantization steps different from each other within a first data range and the quantized data are caused to undergo variable length encoding to select, on the basis of the estimated total code quantity, the quantizer in which the total code quantity is the maximum within the range.

5. A data encoding method as set forth in claim 1, further comprising the step of varying at least one of said threshold values.

6. A data encoding apparatus, comprising:

motion detecting means for determining whether received input data should be processed in a motion mode or a stationary mode;

orthogonal transform means for orthogonally transforming said input data to generate orthogonally transformed data in the form of a plurality of data blocks, wherein when said input data is processed in said motion mode the number of data blocks produced is greater than the number of data blocks produced when said input data is processed in said stationary mode;

quantization step determination means for determining quantization steps on the basis of the orthogonally transformed data and a compression factor indicator, wherein said compression factor indicator is used to set a plurality of threshold values for determining classes of said data blocks on a block-by-block basis, and wherein a quantization step is determined for each said data block according to at least said class corresponding to said data block;

quantizing means for quantizing the orthogonally transformed data according to said quantization steps to generate quantized data; and variable length encoding means for encoding said quantized data according to a variable length encoding procedure.

7. A data encoding apparatus as set forth in claim 6, wherein performing an orthogonal transform includes performing a Discrete Cosine Transform.

8. A data encoding apparatus as set forth in claim 6, wherein determining quantization steps includes estimating total code quantity when the orthogonally transformed data is caused to undergo variable length encoding.

9. A data encoding apparatus as set forth in claim 6, wherein the quantization step determination means includes plural quantizers having quantization steps different from each other, and is operative to estimate total code quantity when the orthogonally transformed data is quantized within a first data range by the quantizers and the quantized data are caused to undergo variable length encoding to select, on the basis of the estimated total code quantity, the quantizer in which the total code quantity is the maximum within the range.

10. A data encoding apparatus as set forth in claim 6, wherein at least one of said threshold values is varied.

11. A data encoding apparatus, comprising:

motion detecting means for determining whether received input data should be processed in a motion mode or a stationary mode;

orthogonal transform means for orthogonally transforming said input data to generate orthogonally transformed data in the form of a plurality of data blocks, wherein when said input data is processed in said motion mode the number of data blocks produced is greater than the number of data blocks produced when said input data is processed in said stationary mode;

quantization number determination means for determining quantizer numbers corresponding to quantization steps on the basis of the orthogonally transformed data and a compression factor indicator, wherein said compression factor indicator is used to set a plurality of threshold values for determining classes of said data blocks on a block-by-block basis, and wherein a quantization step is determined for each said data block according to at least said class corresponding to said data block;

quantizing means for quantizing the orthogonally transformed data according to said quantization numbers to generate quantized data; and variable length encoding means for encoding said quantized data according to a variable length encoding procedure, wherein the quantizer number determination means includes a compression factor table for outputting a code quantity reference value and said threshold values, and a code quantity estimation means that is supplied with the orthogonally transformed data, the respective classes for each data block and said code quantity reference value to estimate total code quantity when the orthogonally transformed data is quantized by plural quantizers and the quantized data undergoes variable length encoding in order to select an optimum one of the plural quantizers on the basis of the estimated total code quantity and the code quantity reference value.

12. A data encoding method, comprising the steps of:

receiving input data;

determining whether said input data should be processed in a motion mode or a stationary mode;

performing an orthogonal transform on said input data to generate orthogonally transformed data in the form of a plurality of data blocks, wherein when said input data is processed in said motion mode the number of data blocks produced is greater than the number of data blocks produced when said input data is processed in said stationary mode;

determining quantization steps on the basis of the orthogonally transformed data and a compression factor indicator, wherein said compression factor indicator is used to set a plurality of threshold values for determining classes of said data blocks on a block-by-block basis, and to set a reference value indicative of a quantity of encoded data, and wherein a quantization step is determined for each said data block according to at least said class corresponding to said data block and said reference value;

quantizing the orthogonally transformed data according to said quantization steps to generate quantized data; and encoding said quantized data according to a variable length encoding procedure.

13. A data encoding method as set forth in claim 12, wherein said step of performing an orthogonal transform includes performing a Discrete Cosine Transform.

14. A data encoding method as set forth in claim 12, wherein, said step of determining quantization steps includes estimating total code quantity when the orthogonally transformed data is caused to undergo variable length encoding.

15. A data encoding method as set forth in claim 12, wherein, said step of determining quantization steps includes estimating total code quantity when the orthogonally transformed data is quantized by plural quantizers having quantization steps different from each other within a first data range and the quantized data are caused to undergo variable length encoding to select, on the basis of the estimated total code quantity, the quantizer in which the total code quantity is the maximum within the range.

16. A data encoding method as set forth in claim 12, further comprising the step of varying at least one of said threshold values.

17. A data encoding apparatus, comprising:

motion detecting means for determining whether received input data should be processed in a motion mode or a stationary mode;

orthogonal transform means for orthogonally transforming said input data to generate orthogonally transformed data in the form of a plurality of data blocks, wherein when said input data is processed in said motion mode the number of data blocks produced is greater than the number of data blocks produced when said input data is processed in said stationary mode;

quantization step determination means for determining quantization steps on the basis of the orthogonally transformed data and a compression factor indicator, wherein said compression factor indicator is used to set a plurality of threshold values for determining classes of said data blocks on a block-by-block basis, and to set a reference value indicative of a quantity of encoded data, and wherein a quantization step is determined for each said data block according to at least said class corresponding to said data block and said reference value;

quantizing means for quantizing the orthogonally transformed data according to said quantization steps to generate quantized data; and variable length encoding means for encoding said quantized data according to a variable length encoding procedure.

18. A data encoding apparatus as set forth in claim 17, wherein performing an orthogonal transform includes performing a Discrete Cosine Transform.

19. A data encoding apparatus as set forth in claim 17, wherein determining quantization steps includes estimating total code quantity when the orthogonally transformed data is caused to undergo variable length encoding.

20. A data encoding apparatus as set forth in claim 17, wherein the quantization step determination means includes plural quantizers having quantization steps different from each other, and is operative to estimate total code quantity when the orthogonally transformed data is quantized within a first data range by the quantizers and the quantized data are caused to undergo variable length encoding to select, on the basis of the estimated total code quantity, the quantizer in which the total code quantity is the maximum within the range.

21. A data encoding apparatus as set forth in claim 17, wherein at least one of said threshold values is varied.

22. A data encoding apparatus, comprising:

motion detecting means for determining whether received input data should be processed in a motion mode or a stationary mode;

orthogonal transform means for orthogonally transforming said input data to generate orthogonally transformed data in the form of a plurality of data blocks, wherein when said input data is processed in said motion mode the number of data blocks produced is greater than the number of data blocks produced when said input data is processed in said stationary mode;

quantization number determination means for determining quantizer numbers corresponding to quantization steps on the basis of the orthogonally transformed data and a compression factor indicator, wherein said compression factor indicator is used to set a plurality of threshold values for determining classes of said data blocks on a block-by-block basis, and to set a reference value indicative of a quantity of encoded data, and wherein a quantization step is determined for each said data block according to at least said class corresponding to said data block and said reference value;

quantizing means for quantizing the orthogonally transformed data according to said quantization numbers to generate quantized data; and variable length encoding means for encoding said quantized data according to a variable length encoding procedure, wherein the quantizer number determination means includes a compression factor table for outputting said threshold values and said reference value, and a code quantity estimation means that is supplied with the orthogonally transformed data, the respective classes for each data block and said reference value to estimate total code quantity when the orthogonally transformed data is quantized by plural quantizers, and wherein the quantized data undergoes variable length encoding in order to select an optimum one of the plural quantizers on the basis of the estimated total code quantity and said reference value.

* * * * *